(12) United States Patent
Moore, III

(10) Patent No.: US 7,460,830 B2
(45) Date of Patent: Dec. 2, 2008

(54) INTER-SATELLITE CROSSLINK COMMUNICATIONS SYSTEM, APPARATUS, METHOD AND COMPUTER PROGRAM PRODUCT

(75) Inventor: Roscoe M. Moore, III, Arlington, VA (US)

(73) Assignee: Peersat, LLC., Silver Spring, MD (US)

( * ) Notice: Subject to any disclaimer, the term of this patent is extended or adjusted under 35 U.S.C. 154(b) by 108 days.

(21) Appl. No.: 11/023,400

(22) Filed: Dec. 29, 2004

(65) Prior Publication Data
US 2005/0143005 A1 Jun. 30, 2005

Related U.S. Application Data

(60) Provisional application No. 60/532,561, filed on Dec. 29, 2003.

(51) Int. Cl.
H04B 7/19 (2006.01)
(52) U.S. Cl. .............. 455/13.2; 455/431; 455/454; 455/13.3
(58) Field of Classification Search ............ 455/427, 455/428, 454, 456.1, 13.1, 13.2, 429, 430, 455/12.1, 13.3, 431, 422.1, 3.02, 457; 370/316, 370/390
See application file for complete search history.

(56) References Cited

U.S. PATENT DOCUMENTS

| | | | |
|---|---|---|---|
| 4,843,397 A | 6/1989 | Galati et al. | |
| 5,579,536 A | 11/1996 | Stackman et al. | |
| 5,739,787 A | 4/1998 | Burke et al. | |
| 5,812,538 A | 9/1998 | Wiedeman et al. | |
| 5,825,325 A | 10/1998 | O'Donovan et al. | |
| 5,828,347 A | 10/1998 | Rossi et al. | |
| 5,982,341 A | 11/1999 | Rossi et al. | |
| 6,018,659 A * | 1/2000 | Ayyagari et al. | 455/431 |
| 6,020,845 A | 2/2000 | Weinberg et al. | |
| 6,239,767 B1 * | 5/2001 | Rossi et al. | 343/882 |
| 6,288,670 B1 * | 9/2001 | Villani et al. | 342/354 |
| 6,333,924 B1 * | 12/2001 | Porcelli et al. | 455/13.1 |
| 6,336,030 B2 * | 1/2002 | Houston et al. | 455/13.2 |

(Continued)

OTHER PUBLICATIONS

Press release No. 2330 (Feb. 17, 2004): "Mitsubishi Electric Announces The Successful Development Of An Airborne Ku-Band Antenna Subsystem for Satellite Communications", 5 pages.

(Continued)

*Primary Examiner*—John J. Lee
(74) *Attorney, Agent, or Firm*—Oblon, Spivak, McClelland, Maier & Neustadt, P.C.

(57) ABSTRACT

A communications system, apparatus, method, and computer program product for inter-satellite and inter-spacecraft crosslinks (ISL) with non-ISL optimized antennas on spacecraft. The system includes a mobile communications platform that includes an ISL antenna configured to transmit information to a target satellite through a non-ISL antenna of the target satellite. The mobile communications platform is configured to relay transmissions through the non-ISL antenna of the target satellite to another communications platform. The mobile communications platform includes a controller configured to determine a location of the mobile platform; determine whether the target satellite is within communications range; and prepare a signal for relayed transmissions through a non-ISL antenna of the target satellite to another communications platform in a signal format that is decipherable by this other communications platform.

16 Claims, 13 Drawing Sheets

U.S. PATENT DOCUMENTS

| | | | |
|---|---|---|---|
| 6,603,957 | B1 | 8/2003 | Sherman et al. |
| 6,628,921 | B1 | 9/2003 | Vaddiparty et al. |
| 6,714,163 | B2 | 3/2004 | Navarro et al. |
| 6,775,251 | B1 * | 8/2004 | Wiedeman et al. .......... 455/427 |

OTHER PUBLICATIONS

JCN Newswire (Mar. 3, 2004): "Mitsubishi Electric Announces The Successful Development Of An Airborne Ku-Band Antenna Subsystem For Satellite Communications" (http://www.japancorp.net/printarticle.asp?Art_ID=6723), 2 pages.

Communication Subsystem Specification Sheet (Aug. 1995) "Functions of the Communication Subsystem", Greg Merritt (http://www.tsgc.utexas.edu/tadp/1995/spects/comm.html), 6 pages.

NASA Goddard Space Flight Center (and) QSS Group, Inc., "CANDOS Experiment Overview", David J. Israel et al., 3 pages.

EADS Space (Jul. 9, 2001) "SILEX Program Laser Communication Between Artemis and Spot 4", (http://www.space.eads.net/web1/press$_{13}$ release.asp?id$_{13}$ tree=236&printer=on) 2 pages.

DLR Oberpfaffenhofen Institute of Communications and Navigation "Aeronautical Broadband Communications via Satellite", M. Werner, et al.:, 14 pages.

L-3 communications/Communication Systems-West, SATCOM Airborne Terminal Products, "Ku-band SATCOM Data Link (KuSDL) Predator (MAE-UAV) Reconnaissance System (Block 1 Upgrade in Progress, circa 2001)", 2 pages.

ViaSat, Inc.-Press Release (Dec. 1, 2003) "LinkStar VSATs Will Provide West-East Pipeline Monitor and Control Communication for China National Petroleum Corp." (http://www.viasat.com/press/?PRINT+friendly&RELEASE=159) , 2 pages.

Massachusetts Institute of Technology (Nov. 2003) "Dynamic Power Allocation and Routing for Satellite and Wireless Networks with Time Varying Channels", Michael J. Neely, 295 pages.

Stephen Horan, "The Potential for Using LEO Telecommunications Constellations to Support Nanosatellite Formation Flying", Klipsch School of Electrical and Computer Engineering, pp. 1-12.

Alex T. Nguyen, et al., "A Direct-To-Ground Architecture for Supporting Commercial Communications from the International Space Station", Center for Satellite and Hybrid Communication Networks, Institute for Systems Research, University of Maryland, 6 pages.

Marco Molina, et al, "Image processing and Transmission by Means of Satellite Network", Dipartimento di Ingegneria Aerospaziale, Politecnico di Milano, Milano, Italy, pp. 1-9.

Franco Bernelli-Zazzera, et al., "In-Orbit Technology Validation for a University Microsatellite", Dipartimento di Ingegneria Aerospaziale, Politecnico di Milano, Milano, Italy, 4 pages.

Bruce E. Underwood, et al., "Breaking Cost and Schedule Barriers Without Sacrificing Mission Assurance or Safety", NASA's Wallops Flight Facility Rapid Response Range Operations Initiative, AIAA $2^{nd}$ Responsive Space Conference 2004, pp. 1-9.

W. Carl Mitchell, et al., "Feasibility of NASA TT&C via Commercial Satellite Services", NASA Contractor Report 204133, National Aeronautics and Space Administration, Lewis Research Center, Oct. 1997, 34 pages.

Integrated Operation Architecture Technology Assessment Study, Science Applications International Corporation, Mar. 2001, 86 pages.

Dr. Joseph Bravman, et al., The Application of a Commercial Wideband Constellation for ISS Communications, Based on Materials Presented to NASA Lewis Research Center, 11 pages.

David R. Beering, "High Definition Television Origination and Distribution from the International Space Station", Consolidated Space Operations Contract, Infinite Global Infrastructures, LLC., 11 pages.

OCE in-Orbit teChnology Experiment set, RUBIN-2, The Rubin-2/OCE Mission, 3 pages.

Spaceport Approach/Departure Safety (SPADS) System, SPADS System Data Flow Block Diagram, VBITS System Level Architecture Diagram, 3 pages (Patent No. 5,739,787.

Space Information Laboratories, Inc., "Vehicle-Based Independent Tracking System (VBITS) for Space Based Aircraft Autoalert & Reporting System", Presented to FAA, Oct. 29, 2001 by Edmund Burke and Edwin Rutkowski, 27 pages (Patent No. 5,739,787).

Space Information Labs, Inc. presents: "Vehicle Based Independent Tracking System (VBITS)" Range Safety Group, Advanced Range Technology, $21^{st}$ Century, Apr. 6, 2005 (Patent No. 5,739,787).

J. S. Baras, et al., "High Data Rate Satellite Networks and Communication Support for NASA Missions", Center for Satellite and Hybrid Communication Networks, Industry Advisory Board Meeting, Feb. 17, 1999, pp. 1-16.

Kul Bhasin, et al., "Space Internet Architectures and Technologies for NASA Enterprises", NASA Glenn Research Center, 11 pages.

Christopher D. Hall, et al., "Virginia Tech Ionospheric Scintillation Measurement Mission", $13^{th}$ Annual AIAA/USU Conference on Small Satellites, SSC99-III-2, pp. 1-10.

Duplex Direct Data Distribution System, NASA/CR—2001-211198, Science Applications International Corporation, National Aeronautics and Space Administration, Glenn Research Center, Oct. 2001, 52 pages.

Thomas A. Brackey, et al., "Commercial Communications for the ISS: System Considerations", Conference on International Space Station Utilization, Space Technology and Applications International Forum (STAIF-99), Feb. 2, 1999, pp. 1-18.

Dr. Stephen Horan, "Using Cell Phones from Satellites", Klipsch School of Electrical and Computer Engineering, Apr. 30, 2000, 24 pages.

Dwayne R. Morgan, et al., "Telemetry Tracking & Control (TT &C)—First TDRSS, Then Commercial GEO & Big LEO and now through LEO", pp. 1-20.

Alex T. Nguyen, et al., "Alternative Network Architectures for Supporting Communications from the International Space Station", American Institute and Aeronautics and Astronautics, pp. 1-10.

Michael Hadjitheodosiou, et al., "Extending IP Services to Future Space Missions", Technical Research Report, pp. 1-10.

Michael Hadjitheodosiou, et al., "Using Commercial Communication Satellite Constellations for Supporting Traffic from NASA Missions", American Institute of Aeronautics and Astronautics, AIAA-2000-1221, pp. 1-11.

John S. Baras, "A Commercial Communications System for the ISS", Center for Satellite and Hybrid communication Networks, Feb. 2, 1999, pp. 1-8.

Michael H. Hadjitheodosiou, et al., "Using Commerical Satellites to Provide Communication Support for Space Missions", Technical Research Report, CSHCN TR Dec. 2002, 6 pages.

W. Carl Mitchell, "Adjunct Payload for ISS High-Rate Communications", STAIF-99, Feb. 2, 1999, 21 pages.

Robert J. Kerczewski, et al., "In-Space Internet-Based Communications for Space Science Platforms Using Commerical Satellite Networks", NASA/TM—1999-209456, Nov. 1999, 14 paages.

M. Kassebom, et al., "Profitable Small Data Communication Services by Using the ORBCOMM Satellite Network" IAC-03-M.4.03, International Astronuautical Federation, pp. 1-10.

* cited by examiner

| Satellite | Zone | Frequency (Hz) | Power (w) | Modulation | Protocol | Data |
|---|---|---|---|---|---|---|
| 1 | 1 | 1.25E+10 | 20 | A | alpha | image 1 |
| 1 | 2 | 1.25E+10 | 40 | A | alpha | image 2 |
| 1 | 3 | 1.25E+10 | 20 | A | alpha | image 3 |
| 2 | 1 | 1.80E+10 | 20 | B | beta | audio 1 |

Fig 8

INTER-SATELLITE CROSSLINK COMMUNICATIONS SYSTEM, APPARATUS, METHOD AND COMPUTER PROGRAM PRODUCT

CROSS REFERENCE TO RELATED APPLICATIONS

This application claims the benefit of the earlier filing date of U.S. Provisional Patent Application Ser. No. 60/532,561, filed on Dec. 29, 2003, the entirety of which is hereby incorporated by reference.

BACKGROUND OF THE INVENTION

1. Field of the Invention

The present invention relates generally to establishing communication links in communication systems, and particularly to establishing communication links between an inter-satellite link (ISL) antenna and a non-ISL antenna when both of the antennas are hosted on objects in space or intended to go into space.

2. Description of the Related Art

FIG. 1 illustrates a conventional system for transmitting information from a non-geostationary orbit (NGSO) satellite to either a cell phone or a commercial television satellite dish. NGSO satellite 1 transmits image data to ground station 2. Ground station 2 transmits the image data to the gateway 3 of a standard, commercial domestic satellite (DOMSAT) which does not possess inter-satellite link or inter-spacecraft link (ISL) antennas. DOMSAT gateway 3 then relays the image data through an up link to DOMSAT 4. DOMSAT 4 then transmits the data to either a satellite cell phone 7 or a commercial television satellite dish 8. To those skilled in the art, it is understood that formatting communications for the non-ISL antennas of a target satellite or DOMSAT is guided by the formatting standards of the communications device that an entity wants to reach through that target satellite or DOMSAT, especially if it is a bent-pipe satellite. When formatting a communications signal for the non-ISL antenna of target DOMSAT 4, one must format that communications signal to meet the standards of satellite cell phone 7 or commercial television satellite dish 8 in this example. The antennas on DOMSAT satellite 4 are non-ISL antennas because they are designed to transmit or receive image and other data from receivers located on Earth rather than transmitters and receivers located in space. Non-ISL antennas are not designed or optimized to conduct an inter-satellite or inter-spacecraft link. An antenna that is not optimized for inter-satellite or inter-spacecraft cross-links is defined as an antenna, on a spacecraft, that is not purposefully pointed towards the source or destination antenna that the non-ISL antenna intends to communicate with. When "pointing" or "tracking" is discussed, reference is being made to using both the antenna boresight and using the antenna main lobe of the non-ISL antenna to point or track towards the source or destination antenna the non-ISL antenna intends to communicate with. As defined by those skilled in the art, antenna boresight, also known as the axis of the antenna, is the direction of highest power density of the antenna, and the antenna main lobe includes within its pattern the antenna boresight.

FIG. 2 illustrates a system for transmitting information using a Tracking and Data Relay Satellite System (TDRSS) satellite. TDRSS is a communication relay system which provides inter-satellite and inter-spacecraft links (ISL) to relay communications between low earth orbiting (LEO) spacecraft and the ground. The antennas on a TDRSS satellite include ISL optimized antennas that point their antenna boresight at the source or destination antenna that they intend to communicate with. In FIG. 2, a space station 11, which is a LEO platform, uses an ISL antenna to establish an ISL link to a TDRSS satellite 13 and that TDRSS satellite's ISL antenna. Alternatively, a space shuttle 12, which is in LEO, establishes an ISL link with another one of the TDRSS satellite's ISL antennas. The ISL antennas on the TDRSS satellite then relay the data received from the space station or the space shuttle through a feeder or service link antenna aboard TDRSS down to a non-moving or low-relative-motion antenna at a ground station 14. Customer data is sent through ground station 14.

Besides the space station or a space shuttle, the NGSO satellite (FIG. 1) may be able to communicate information to a TDRSS satellite through an ISL link between an ISL antenna on the NGSO satellite and an ISL antenna on TDRSS.

Ground station 14 transmits the data received from the TDRSS satellite 13 to DOMSAT gateway 3 (in FIG. 1). DOMSAT gateway 3 then relays the data to DOMSAT 4. DOMSAT 4 then transmits the data through its non-ISL antennas to satellite cell phone 7 or commercial satellite television dish 8 or to another end user by relaying the data through DOMSAT 4. The two uplinks within this communication, one from the space station 11 to a TDRSS satellite 13, and the other from the DOMSAT ground station gateway 3 to the DOMSAT 4 are illustrative of what is known as a "double hop."

ISL antennas are designed to move so as to track satellites which are communicating therewith, where the "boresight" of the antenna is steered to point at the satellite; thereby keeping the satellite within the largest gain portion of the ISL antenna, namely the boresight and main lobe of the ISL's antenna pattern, in communications range. ISL antennas are designed to communicate with another ISL antenna moving at over 17,000 mph relative to a stationary point on Earth. The single-access ISL antennas on TDRSS are designed to link with one custom-built LEO satellite ISL antenna at a time.

Non-ISL antennas on satellites are designed and used to communicate with aircraft or ground antennas within the Earth's atmosphere, and these non-ISL antennas are generally fixed and do not track satellites or other fast moving spacecraft with their antenna boresight. Some non-ISL antennas on satellites are pointable, but they are not designed to actively track an object outside of the Earth's atmosphere with their antenna boresight. They are designed to link with near-fixed antennas in the Earth's atmosphere. Compared to the 17,000 mph that satellites in space travel at, an aircraft's relative motion within the Earth's atmosphere appears near-fixed from the perspective of a satellite's non-ISL antenna.

In another conventional system, a Predator unmanned aircraft (not shown) transfers data through a 2-way communications link to a geostationary (GEO) satellite's non-ISL antenna. The link established by a Predator aircraft is not between two objects in space, and thus does not address the problems of establishing a link between two objects moving much faster relative to each other in space (i.e., around 17,000 mph), correcting for a much higher level of Doppler shift, tracking while traveling at such a high rate of speed, and pointing at a target at a much higher altitude with a more extreme off-antenna-boresight orientation.

The conventional design approach for an antenna used for satellite communications is to provide as much antenna gain as possible, while still being able to keep the target within the highest gain portion of the satellite's antenna pattern. The higher the antenna gain, the lower the required transmitter power needed to close a communication link between the satellite and the target. Usually high-gain antennas have characteristic "sidelobes," which are lower gain regions of an antenna pattern. These sidelobes are typically not used for communicating with the intended target since the antenna gain in the sidelobes is lower than that of the main lobe of the antenna and much lower than the gain found when being on-axis with the antenna boresight.

The conventional design approach for an antenna used in inter-satellite crosslink communications is to point the antenna boresight and the antenna main lobe towards the source or destination antenna that that antenna is communication with. U.S. Pat. No. 5,579,536, the contents of which are hereby incorporated by reference in its entirety, states that an inter-satellite cross-link is maintained where both the source and destination or intermediate communication satellite's antennas are pointed toward each other and data communication is occurring. The conventional design approach for inter-satellite crosslink communications does not address the large pointing errors, the low gain, and the other problems of trying to conduct inter-satellite crosslink communications when at least one of the communicating antennas is not pointed towards or actively tracking the antenna it is trying to communicate with.

The above described satellite communication systems rely on dedicated communications equipment designed for single purposes. Such equipment is very expensive. For example, 30 million dollar ground antennas are common when relaying imagery or other data from a custom built satellite to the ground. When not using these expensive ground antennas, the alternative sometimes is to use an ISL data relay to a 500 million dollar or more expensive satellite with custom built ISL antennas on board.

"Aeronautical Broadband Communication Via Satellite," by M. Werner and M. Holzbock, DLR Oberpfaffernhofen, Institute of Communications and Navigation describes an aircraft linking with non-ISL antennas on GEO satellites, and is hereby incorporated by reference in its entirety. However, this system does not function in space because it does not account for the additional speed a spacecraft travels at, the much higher altitude a satellite travels at, and the difficulties of maintaining communications when the communicating antennas spend more of their time in an off-boresight orientation.

U.S. Pat. No. 6,714,163, the contents of which are hereby incorporated by reference in its entirety, discloses a phased array aircraft antenna, which is not in space, accessing satellites.

U.S. Pat. No. 5,579,536, the contents of which are hereby incorporated by reference in its entirety, states that an inter-satellite crosslink is between two antennas that are pointed towards each other.

Other concepts relevant to satellite communications are found in U.S. Pat. Nos. 6,020,845, 6,775,251, 6,628,921, 5,825,325, 6,714,163, 6,603,957, and 5,812,538 the entire contents of which are incorporated herein by reference.

Also, the International Telecommunications Union (ITU) and the United States Federal Communications Commission (FCC) establish various requirements and regulations relevant to satellite communications, including regulations pertaining to pointing, power, frequency, and other requirements for inter-satellite links, the entire contents of which are incorporated by reference. In general, the ITU and FCC have separate and different regulations for the various requirements for inter-satellite crosslink communications when compared to their regulatory requirements for other satellite communications. This is to prevent these inter-satellite crosslink communications from interfering with other types of non-ISL satellite communications. The conventional ITU and FCC approach to separate the regulatory requirements for ISL communications and non-ISL communications does not address the opportunities or challenges associated with regulating an ISL communication to a non-ISL antenna or the various requirements of conducting ISL communications within the various regulatory requirements for non-ISL satellite communications. By preparing for the opportunity of ISL communications within non-ISL frequency and other regulatory requirements, the ITU or FCC could free a lot of additional frequency spectrum for increased uses.

However, as recognized by the present inventor there are multiple markets for an inter-satellite or inter-spacecraft communications system that can use the already-built communications infrastructure provided by current non-ISL satellite communication systems or that can mimic the performance and requirements of a non-ISL satellite communication system. For example, a spacecraft can acquire images of the Earth and transmit them directly to a television set by relaying these transmissions in only "one hop" through the non-ISL antenna of a television broadcasting DOMSAT in GEO and on to the targeted television set which is connected to a satellite TV antenna on the ground. A spacecraft can acquire data from outer space and relay this data in "one-hop" through the non-ISL antenna of a low earth orbit (LEO) Globalstar or Iridium satellite and then down to a satellite cell phone on the ground. A spacecraft on the Planet Mars can relay its data through a satellite in LEO, and then this same data can be relayed again through the non-ISL antenna of a DOMSAT in GEO and on to a cable television satellite head-end antenna on the ground. A satellite in LEO can receive a voice transmission from satellite cell phones or other ground stations on Earth and interface with the non-ISL antennas of an existing DOMSAT in GEO to relay that voice transmission to a satellite TV end-user through the audio or voice portion of their television set.

The conventional method of delivering images, voice, video, and data from a spacecraft to a ground antenna, and then later relaying that same information through a second satellite to a second ground antenna, requires the use of more communication infrastructure than relaying all of that same information directly from the original spacecraft through the second satellite to the second ground antenna. The additional communication infrastructure required for communicating with the conventional approach in this example would include, at minimum, an additional ground station 2 (from FIG. 1) and an additional DOMSAT gateway 3. Many satellite ground stations 2 and DOMSAT gateway antennas 3 are extremely expensive, because they are designed for specialized one-of-a-kind satellite communications requirements. Most satellite cell phones 7 and satellite TV antennas 8 are comparatively very inexpensive because they are designed to be produced in high quantities for a mass market of hundreds of thousands of end users. Replacing specialized one-of-a-kind satellite ground antennas with cheap mass consumer market satellite antennas could save tens of millions to hundreds of millions of dollars in satellite ground infrastructure construction and operation costs. In order to replace ground station 2 and DOMSAT gateway 3 antennas with satellite cell phones 7 or satellite TV antennas 8 in the example above, a spacecraft must be able to deliver images, voice, video, or data directly through DOMSAT's non-ISL antenna to satellite cell phones 7 or satellite TV antennas 8.

The conventional methods of delivering images, voice, video, and data through ISL communications systems to end users using non-ISL satellite communication systems suffers from a lack of hardware availability, because the hardware for conventional satellite communications systems is inflexible and cost prohibitive. Around 99 percent of the ground antennas that work with a satellite communications system only work with a satellite communications system that does not possess inter-satellite link antennas or other ISL hardware. The conventional approach for relaying ISL communications to these 99 percent of ground antennas requires the design, construction, and launch of extremely expensive custom-built satellites with a combination of specialized ISL and non-ISL antennas or the expensive "double hop" relay of ISL communications through an expensive ISL satellite with ISL antennas down to a ground station and then back up to another satellite with non-ISL antennas to relay to the ground again. Eliminating the design and use of ISL-specific satellites and "double hops" could save hundreds of millions of dollars in infrastructure and operational costs within a satellite communications system. In order to avoid these inefficient "double hops" or the design and use of custom-built relay satellites with ISL antennas, one must be able to use the existing non-ISL satellite communications infrastructure to conduct ISL communications.

Conventional ISL antennas are designed to communicate on-axis, on-antenna boresight, and within a narrow beam width and narrow antenna main lobe. There is currently a need for an alternative system to conduct inter-satellite cross-links with non-ISL antennas on spacecraft that were not designed for an inter-satellite cross link communications. There is currently a need for a method of conducting ISL cross-links off-axis and off-boresight with non-ISL antennas that do not point their antenna boresight towards fast-moving spacecraft. There is also a need for specialized apparatus which could improve the performance of these new and unconventional systems and methods. By designing such a system, method, and apparatus, one could avoid the expenses associated with the costly in-space and on-the-ground hardware of the conventional systems.

Current ISL equipment cannot relay communications through feeder or service (non-ISL) link antennas. Unique ISL missions, such as the Iridium satellite telephony system, create a need for expensive and custom designed ISL equipment that perform only ISL communications on each spacecraft.

Feeder or service (non-ISL) link space stations are designed for earth station communication standards. Non-ISL spacecraft antennas are not designed to track a spacecraft. ISL antennas and ISL spacecraft are designed to track and point at other spacecraft. ISL equipment is not designed to operate in conjunction with the frequency, modulation, regulatory, and other requirements for non-ISL antennas.

Therefore, what is desired is as discovered by the present inventor, is a communications method, a communications system, and a communications platform that can adapt to relay information from an ISL antenna in space to another satellite's non-ISL antenna.

SUMMARY OF THE INVENTION

An object of the present invention is to address the above-identified and other limitations of conventional satellite systems. Another aspect of the present invention concerns spacecraft to spacecraft cross-links that will primarily be off-antenna boresight and off-axis for at least one non-ISL antenna participating in the cross-link, but these cross-links will not necessarily be outside of the same non-ISL antenna's main lobe. A spacecraft-to-spacecraft cross-link of the present invention is named here as a PeerSat Link (or PSL when abbreviated in short form).

For example, one aspect of the present invention is to provide an adaptable communications platform on a spacecraft that communicates using a specially designed ISL antenna and transmits data to a target satellite through that target satellite's non-ISL antenna, which is not designed to support communications from other spacecraft. The communications platform of the present invention is typically a mobile platform in space or intended to go into space that is in relative motion with respect to the target satellite's non-ISL antenna. The communications platform is considered adaptable because it is able to predict, determine, or know its location and orientation in relation to a target satellite, and then adapt to communicate with the non-ISL antenna of that target satellite based on a combination of this location and orientation information and information concerning the suitability of that target satellite's capability as a communications resource. It is possible that the communications platform may only adapt to the extent that it attempts to conduct a communications link or does not attempt to conduct a communications link with a target satellite's non-ISL antenna. The ability to adapt is important because the adaptable communications platform in space will likely be changing its orientation and location with respect to suitable target satellites on the order of seconds and minutes, and this adaptable communications platform must determine the suitability of a target satellite, its orientation with respect to a target satellite, its location with respect to a suitable satellite, and whether or not it wants to attempt communications with a suitable target satellite in a very short period of time. The ability of the adaptable communications platform to rapidly adapt its communication attempts to on or off, allows this platform to avoid wasting energy trying to communicate with unsuitable target satellites or target satellites out of range, and it allows this platform to avoid interfering with the communications of other satellites and other communications devices that it does not intend to communicate with.

Another aspect of the present invention is for the adaptable communications platform to be adaptable in such a way that it recognizes which lobe of the target satellite it is communicating with, the appropriate frequency, power, modulation, communication protocol, and other requirements necessary to establish communication with the target satellite. The communications platform may also be adaptable, when it only communicates with a particular target satellite, in that the communications platform recognizes when it is in communications range and when it is not in communications range and can adjust its power settings, for example, accordingly.

The communications platform of the present invention also obtains appropriate scheduling information to be able to recognize which satellite it is communicating with and when the next satellite is going to be in range.

Another aspect of the invention is that the adaptable communications platform is capable of communicating with more than one target satellite at one time.

Another aspect of the present invention is that it includes a frequency agile radio that monitors radio frequency communications to the non-ISL antenna of the target satellite and determines an unused portion of the frequency spectrum. This allows for the transmission of information to the target satellite for specific telecommunication purposes within that unused frequency spectrum. This aspect of the present invention is named here as the PeerSat Link Agile Radio.

Another aspect of the present invention is that it includes a software defined radio which allows it to change the modulation of its communication signals from QPSK, to QAM, to 8PSK, to CDMA, to GSM, and to other modulation waveforms to allow it to communicate with the different modulation standards of satellite television, cable television, satellite telephone, wireless telephone, and other communications systems.

Another aspect of the present invention is its inclusion of a capability to determine the information display standards of an end-user's communication terminal, determine how to send information to that end-user on a particular television channel or telephone number or other standardized communications channel, and then to format and deliver information to that end-user's communications terminal as a particular channel. This aspect of the present invention is named here as the PeerSat Link Channeler.

The present invention also includes a specialized antenna that is configured to allow an inter-satellite or inter-spacecraft communications crosslink to a target satellite's non-ISL antenna. Configuration of this specialized antenna includes configuration of associated methods for forming communication links, ground stations, computers, and software to establish communication links. This specialized antenna of the present invention is named here as the PeerSat Link Antenna.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a data structure look-up table used by an adaptable communications platform;

DETAILED DESCRIPTION OF THE INVENTION

Figure 1:
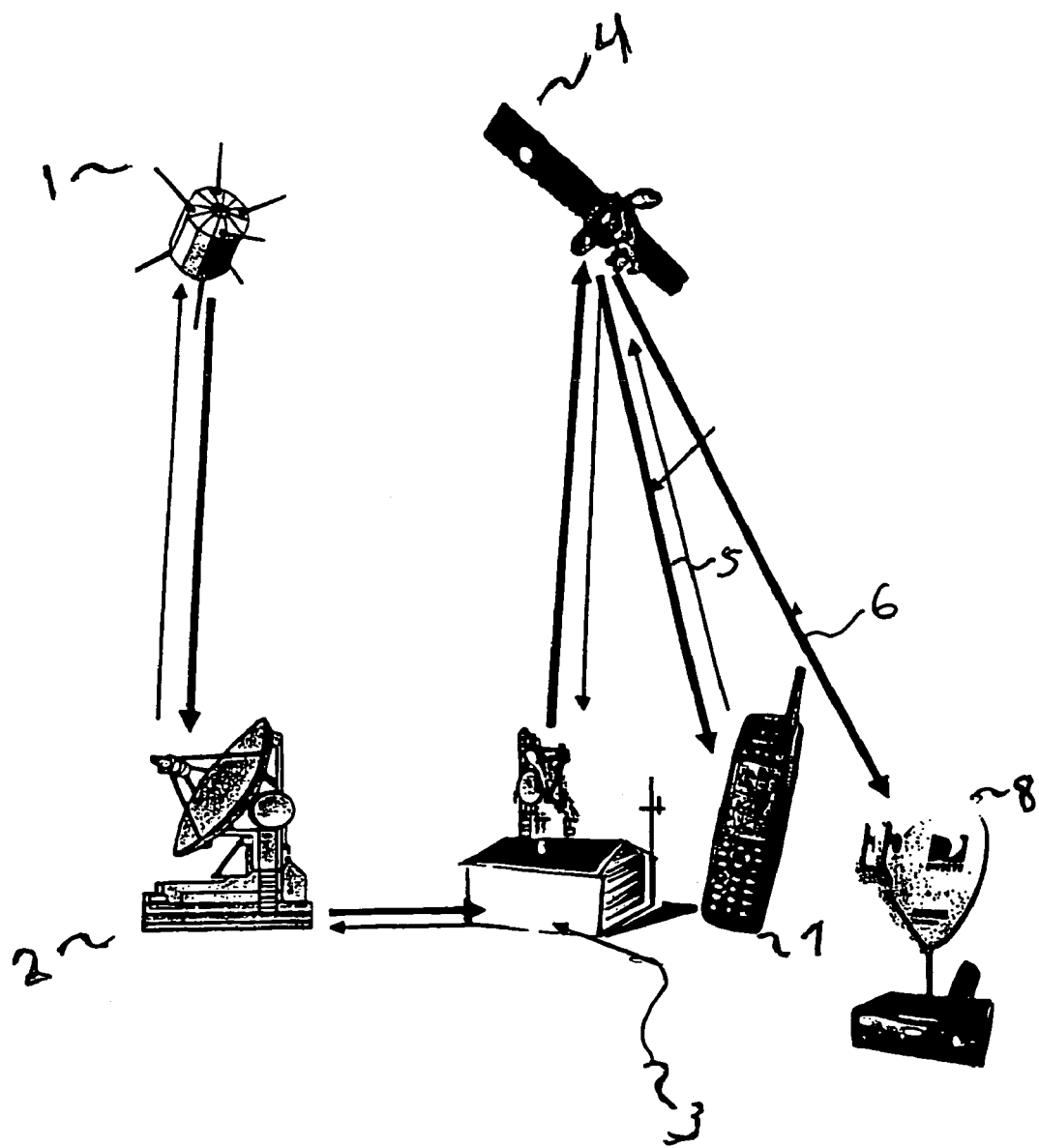
FIG. 1 is a system diagram of a conventional satellite communication system where ISL links are not present or used.
Figure 2:
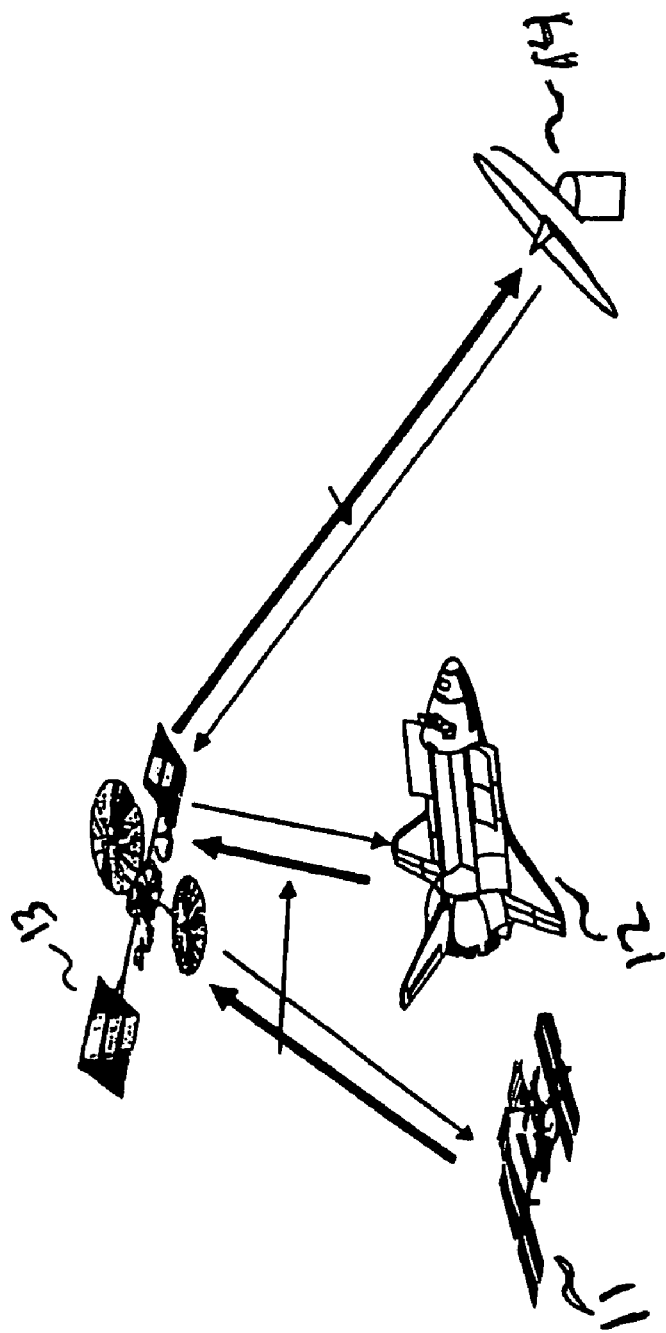
FIG. 2 is a system diagram of a conventional satellite communication system using the Tracking and Data Relay Satellite System (TDRSS) which is designed for ISL links.
Figure 3:
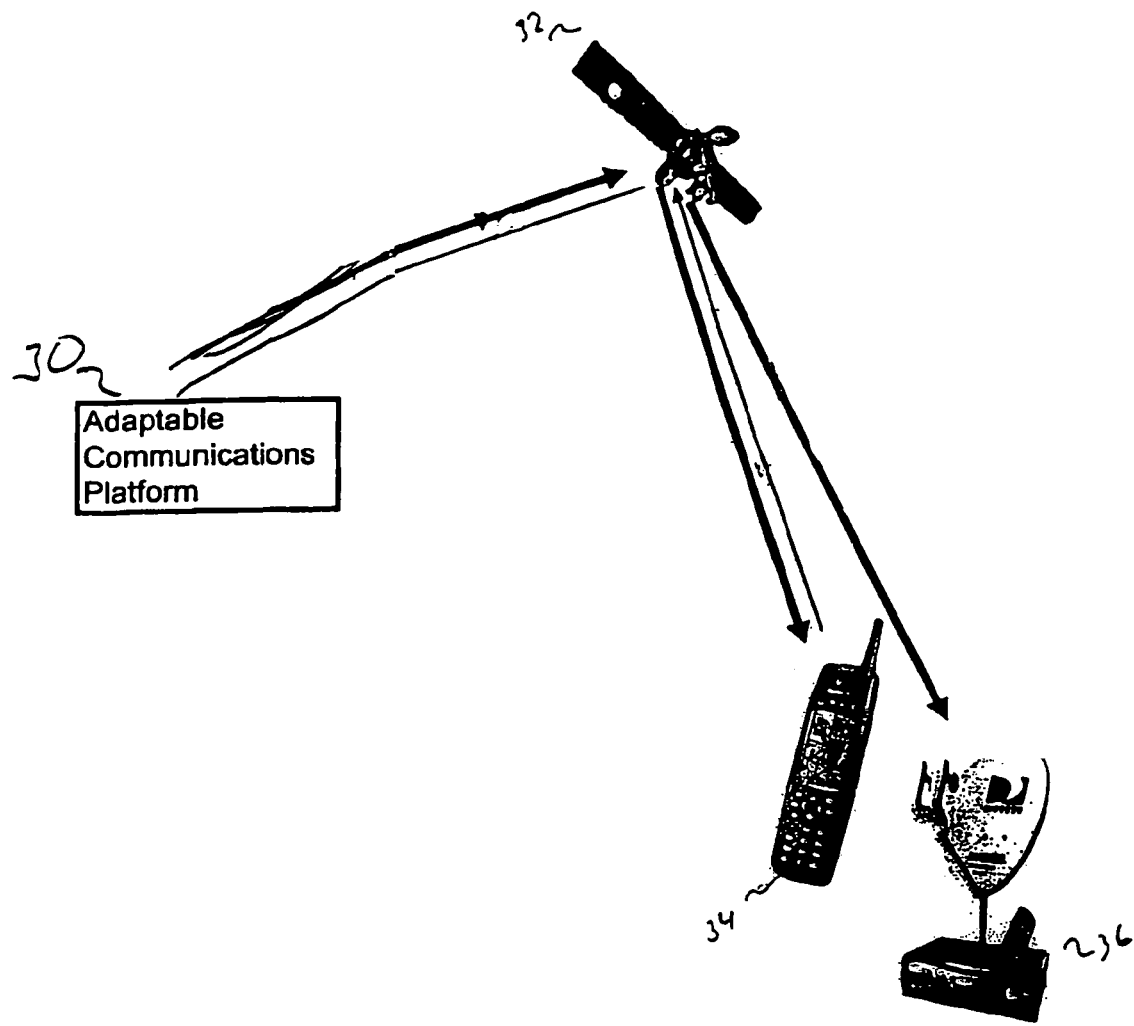
FIG. 3 is a system diagram of a communication system using an adaptable communication platform of the present invention which displays an ISL link between the platform and a non-ISL antenna on a target DOMSAT satellite.

Referring now to the drawings, wherein like reference numerals designate identical or corresponding parts throughout the several views and more particularly to FIG. 3 thereof, there is depicted a satellite communications system utilizing an inter-satellite communications link between the antennas of objects in space where at least one of the antennas used in this inter-satellite communications link is a non-ISL antenna. An inter-satellite or inter-spacecraft communications link between the antennas of objects in space or intended to go into space where at least one of the antennas used is a non-ISL antenna, as described below, is a PeerSat Link. Objects in space or intended to go into space are objects that are 50 kilometers or more above the surface of the Earth or objects with the velocity, intended potential energy, or other factors that would have them travel to over 50 km above the surface of the Earth.

In FIG. 3, the adaptable communications platform 30 of the present invention is equipped with an ISL antenna. The adaptable communications platform 30 forms a communications link with DOMSAT satellite 32. DOMSAT satellite 32 is equipped with non-ISL antennas. The DOMSAT satellite 32 then transmits the data received from the adaptable communications platform 30 to mobile satellite communication device 34 or to satellite television dish receiver 36.

The non-ISL antennas are not designed or optimized to conduct an inter-satellite or inter-spacecraft link. An antenna that is not optimized for inter-spacecraft or inter-satellite cross-links is defined as an antenna, on a spacecraft, that is not purposely pointed towards the source or destination antenna that the non-ISL antenna intends to communicate with. When "pointing" or "tracking" is discussed, reference is being made to using both the antenna boresight and using the antenna main lobe of the non-ISL antenna to point or track towards the source or destination antenna that the non-ISL antenna intends to communicate with.

In an embodiment of the invention, the adaptable communications platform 30 is able to simultaneously communicate with more than one satellite. When communicating with a plurality of satellites, the adaptable communications platform 30 intentionally increases its beam width, and lowers its antenna gain in the direction of any one satellite to be able to use this massive increase in beam width to communicate with a plurality of satellites at once. An example of such an antenna is an adaptable phase array antenna. Another example of such an antenna is an adaptable mechanically steered and gimbaled antenna. Another example of such an antenna is a fixed, non-steerable omni-directional antenna whose effective beam width may be 100 degrees or more.

In another embodiment, the focus of the beam is decreased to intentionally broadcast a longer main lobe (e.g. 20° or greater), usually with a lower gain (e.g. 3 to 10 dB), to ensure that the adaptable communications platform 30 does not miss the plurality of satellites that it intends to communicate with. When the adaptable communication platform 30 communicates with a single satellite, the communications beam adapts to become a tight beam (e.g. 5° or less with a gain of 10 to 20 dB).

When the adaptable communications platform 30 communicates with a target satellite 32, the adaptable communications platform 30 is located either in a main lobe or a side lobe of the DOMSAT 32. In one embodiment, while located in a main lobe, the adaptable communications platform 30 is off axis from the antenna boresight of the non-ISL antenna of the target satellite. The antenna boresight is defined as the direction of highest power density of that non-ISL antenna. In one embodiment, the main lobe of DOMSAT 32 covers the entire continental United States. The antenna boresight of the DOMSAT 32 non-ISL antenna is the part of the main lobe where the highest power is located, and is not tracking the adaptable communications platform 30 even though the adaptable communications platform may be within the large main lobe of the target DOMSAT satellite's non-ISL antenna.

When communicating with the non-ISL antenna of the target satellite DOMSAT 32, the boresight of the antenna on the adaptable communications platform 30 is pointed with high accuracy at the non-ISL antenna of the target satellite and thus the signal level of the communications signal increases with the increased antenna gain. Alternatively, when the adaptable communications platform 30 communicates in a side lobe of satellite 32, a loss in antenna gain is experienced and so a commensurate drop in data throughput is experienced to offset the loss in gain. Alternatively, when the adaptable communications platform 30 communicates significantly off-boresight yet still within the main lobe of satellite 32, a loss in antenna gain is experienced and so a commensurate drop in data throughput is experienced to offset the loss in gain. One solution to the loss in data or gain is to increase the transmit power, although as a practical matter the available power is limited by the power capacity of the high power amplifier used in the platform. Another solution would be to avoid transmitting information while the adaptive communications platform is in a side lobe or is otherwise significantly off-boresight, and to later increase data throughput when a better communications orientation is found. Another solution is to wait for a better opportunity to transmit information at the same data rate with the same target satellite on a future orbit or a new target satellite on the same orbit. Another solution would be to distribute the power across a broader beam width and use a spread spectrum technique to convey a lesser amount of data to a single, or in some situations many, target satellites to accomplish the communications link. U.S. Pat. No. 6,775,251, the contents of which are hereby incorporated by reference in its entirety, describes how a spread spectrum technique can be used to communicate with a plurality of satellites at once.

In another embodiment, the adaptable communications platform 30 is capable of dynamically adapting the power up or down to fit the situation as appropriate.

Target satellite 32, in FIG. 3, is typically a geostationary satellite (GEO) with an earth-beam antenna and without ISL antennas. The adaptable communications platform communicates with the earth-beam (non-ISL) antenna of the target satellite 32.

In an embodiment of the present invention, the antenna on the adaptable communications platform 30 is designed to track a target satellite that it is communicating with. This is accomplished by the adaptable communications platform 30 being equipped with an ISL antenna that communicates with the non-ISL earth-beam antenna on the target satellite 32. The non-ISL antenna on satellite 32 does not track a moving target and it is not designed to track moving targets. The earth-beam antenna of target satellite 32 is non-tracking in the sense that target satellite 32 is not designed to keep its antenna boresight pointed towards the adaptable communications platform 30, and the adaptable communications platform 30 ends up off-boresight and off-axis in either the side lobe or main lobe of the non-ISL antenna. However, the adaptable communications platform 30 is opportunistic, in that it adapts its data transfer rate based on the capacity of the link at a particular location. For example, when on-boresight or on axis in the middle of the main lobe of the target satellite's earth-beam antenna, the data rate is higher than when the adaptable communications platform 30 is on the fringe of coverage in the side lobes. Due to this predictable variation in signal strength, the adaptable communications platform 30 bursts the data at a higher rate when the signal coverage is good (e.g. within the main lobe of the earth-beam antenna, near boresight) and uses a reduced data rate when the coverage is bad, when way off-boresight or located in a side lobe.

In exemplary embodiments using the present invention, an adaptable communications platform that has a relative motion with respect to Earth forms a link, in accordance with the present invention, with a DOMSAT and relays information from the adaptable communications platform to another satellite, an airplane, a commercial television satellite receiver dish, or a cell phone (or a cell phone system) through the non-ISL antenna of DOMSAT. In another exemplary embodiment, a space shuttle, equipped with an adaptable communications platform, forms a link in accordance with the present invention and relays information to a DOMSAT, which in turn relays the information to another satellite, an airplane, commercial television satellite receiving dish, or a mobile phone. In another exemplary embodiment, a rocket moving into space, equipped with an adaptable communications platform, relays pictures to a non-ISL antenna of a military geostationary satellite through a communications link of the present invention. The military geostationary satellite then transfers the pictures to a military UHF phone, a LEO satellite with an adaptable communications platform, or to a commercial GEO satellite (after a relay down to a LEO satellite with an adaptable communications platform that then relays the signal back up to the commercial GEO satellite), and then the pictures are transferred down to a commercial satellite dish receiver.

In an embodiment when the adaptable communications platform is moving relative to the target satellite, the communications will need to be corrected for Doppler shift on transmission or reception. Either the transmit antenna or the receive antenna operate at a frequency that would adjust for the Doppler shift as the amount of the Doppler shift changes. The adjustment in frequency or the Doppler shift is equal to F*Rr/C, where F is the transmission frequency, Rr is the range rate or velocity that the 2 spacecraft are moving in relation to one another (i.e. not their movement relative to the Earth), and C is the speed of light. In appropriate circumstances, the relativisticly correct Doppler shift equation is used. It is also possible to calculate Doppler shift of existing satellites with on-line resources such as those provided in the SUNSAT program, the entire contents of which are incorporated by reference. The results of the Doppler shift analysis would be incorporated into the adaptable communications platform in space or would be utilized on the end-user communications devices that are at the opposite end of the communications link with the adaptable communication platform.

Table 1, shown below, describes example inputs for a link budget analysis for an embodiment of the communications system depicted in FIG. 3. In determining the values listed in the table, the following assumptions were made: pointing loss associated with 1 degree accuracy; use of a Gregorian Reflector type (75% efficiency), 10.0 gain antenna; the transmitter gain is equal to the receiver gain; transmission is equal to uncoded autotrack DG1 modes 1, 2, 3I, BPSK, Ku band; and that conversion and amplification of the signal is perfect with no corruptions in the GEO satellite. Table 2 shows the link budget analysis for the adaptable communications platform (ACP), and Table 3 shows the link budget analysis for a GEO satellite.

TABLE 1

| Inputs | Symbol | Units | Value |
|---|---|---|---|
| Altitude | h | km | 500 |
| LEO Transmitter Power | $P_t$ | W | 20 |
| GEO Transmitter Power | $P_t$ | W | 50 |

TABLE 2

|  | Symbol | Units | Value |
|---|---|---|---|
| LEO Orbit Mechanics |  |  |  |
| Radius of Satellite Orbit | $R_{sat}$ | km | 6878.14 |
| Maximum Receiver Angle | $\theta_{recmax}$ | ° | 11 |
| Maximum Slant Range | $R_s$ | km | 44232.21 |
| LEO ACP Design Transmitter |  |  |  |
| Transmitter Power | $P_t$ | dBW | 13.01 |
| Transmitter Antennae Gain | $G_t$ |  | 10.00 |
| Transmitter Antennae Gain | $G_{tdB}$ | dB | 10.00 |
| Frequency | f | Hz | 1.25E+10 |
| Wavelength | $\lambda$ | m | 0.024 |
| Data Rate | R | bps | 200000 |
| EIRP | EIRP | dBW | 23.01 |
| Error Bit Rate From Plot | EBR | dBHz | 9.6 |
| Reciever |  |  |  |
| Required Receiver Power | $P_{rec}$ | dBW | −186.99 |
| Efficiency | $\eta$ | % | 75% |
| Diameter | D | ft | 4.5 |
| Diameter | D | m | 1.3716 |
| Power Gain | $G_r$ |  | 24209.99 |
| Power Gain | $G_{rdB}$ | dB | 43.84 |
| System Temperature | $T_{sys}$ | K | 1000.00 |
| Total Gain R & T | G | dB | 53.84 |
| Total Gain R & T | G |  | 242099.88 |
| Losses |  |  |  |
| Transmitter Loss | $L_t$ | dB | 3 |
| Space Loss | $L_s$ |  | 5.37E+20 |
| Space Loss | $L_s$ | dB | 207.30 |
| $\theta_{3dB}$ | $\theta_{3dB}$ | ° | 1.22 |
| $\theta$ | $\theta$ | ° | 1 |
| Pointing | $L_{pt}$ | dB | 8.01 |
| Polarization | $L_{pol}$ | dB | 3 |
| Total Losses | $L_{tot}$ |  | 1.35E+22 |
| Total Losses | $L_{tot}$ | dB | 221.31 |
| Power |  |  |  |
| Received Power | $P_r$ | W | 3.58E−16 |
| Received Power | $P_r$ | dBW | −154.46 |
| $E_b$ | $E_b$ | J | 1.79E−21 |
| $E_b$ | $E_b$ | dB | −207.47 |
| $N_o$ | $N_o$ | J | 1.38E−20 |
| $N_o$ | $N_o$ | dB | −198.60 |
| $E_b/N_o$ | $E_b/N_o$ |  | 0.13 |
| $E_b/N_o$ | $E_b/N_o$ | dB | 8.87 |
| Actual Margin | M | dB | 0.73 |
| Desired Margin |  | dB | 3 |

TABLE 3

|  | Symbol | Units | Value |
|---|---|---|---|
| GEO Orbit Mechanics |  |  |  |
| Radius of Satellite Orbit | $R_{sat}$ | km | 42143.14 |
| Minimum Elevation Angle | $\theta_{elmin}$ | ° | 20 |
| Maximum Slant Range | $R_s$ | km | 40408.53 |
| GEO Satellite Design GEO Sat |  |  |  |
| Received Power Transmitter | $P_r$ | dBW | −154.46 |
| Transmitter Power | $P_t$ | dBW | 16.99 |
| Transmitter Antennae Gain | $G_t$ |  | 10.00 |
| Transmitter Antennae Gain | $G_{tdB}$ | dB | 10.00 |
| Frequency | f | Hz | 1.25E+10 |
| Wavelength | $\lambda$ | m | 0.024 |
| Data Rate | R | bps | 200000 |
| EIRP | EIRP | dBW | 23.01 |
| Error Bit Rate From Plot | EBR | dBHz | 9.6 |
| Receiver |  |  |  |
| Required Receiver Power | $P_{rec}$ | dBW | −186.99 |
| Efficiency | $\eta$ | % | 75% |
| Diameter | D | ft | 1.5 |
| Diameter | D | m | 0.4572 |
| Power Gain | $G_r$ |  | 2690.00 |
| Power Gain | $G_{rdB}$ | dB | 34.30 |
| System Temperature | $T_{sys}$ | K | 300.00 |
| Total Gain R & T | G | dB | 44.30 |
| Total Gain R & T | G |  | 26899.99 |
| Losses |  |  |  |
| Transmitter Loss | $L_t$ | dB | 3 |
| Space Loss | $L_s$ |  | 4.48E+20 |
| Space Loss | $L_s$ | dB | 206.52 |
| Atmospheric Loss | $L_{atm}$ | dB | 8.00 |
| $\theta_{3dB}$ | $\theta_{3dB}$ | ° | 3.67 |
| $\theta$ | $\theta$ | ° | 1 |
| Pointing | $L_{pt}$ | dB | 0.89 |
| Polarization | $L_{pol}$ | dB | 3 |
| Total Losses | $L_{tot}$ |  | 1.38E+22 |
| Total Losses | $L_{tot}$ | dB | 221.41 |
| Power |  |  |  |
| Received Power | $P_r$ | W | 9.73E−17 |
| Received Power | $P_r$ | dBW | −160.12 |
| $E_b$ | $E_b$ | J | 4.87E−22 |
| $E_b$ | $E_b$ | dB | −213.13 |
| $N_o$ | $N_o$ | J | 4.14E−21 |
| $N_o$ | $N_o$ | dB | −203.83 |
| $E_b/N_o$ | $E_b/N_o$ |  | 0.12 |
| $E_b/N_o$ | $E_b/N_o$ | dB | 9.30 |
| Actual Margin | M | dB | 0.30 |
| Desired Margin |  | dB | 3 |

Values and parameters used in the tables are conventional, as would be appreciated by one of ordinary skill in the satellite communications art (see, e.g. *Satellite Communication Systems Engineering*, Wilbur L. Pritchard and Joseph A. Sciulli, Prentice-Hall Inc., 1986, the entirety of which is hereby incorporated by reference).

The tables above show how a communications link is established between the ISL antenna of the adaptable communications platform (ACP) and the non-ISL antenna of the GEO-stationary satellite. The increase in pointing losses requires an increase in transmitter power for better performance. The above tables were calculated assuming a one degree of uncertainty and 8 dB of pointing loss, which is high for an ISL link. With this level of pointing uncertainty and pointing loss, the link between the ISL antenna of the adaptable communications platform and the non-ISL antenna is successful, but has a low yet positive link margin of under 1 dB. To create a better link margin, 3 dB or higher, the transmitter power on the adaptable communications platform is increased. For example, if the power in the above example is increased from 20W to 40W, the link margin of the LEO increases to 3.74 dB. By increasing the accuracy of how the ISL antenna tracks the non-ISL antenna, a higher link margin is achieved with out increasing the power.

Figure 4:
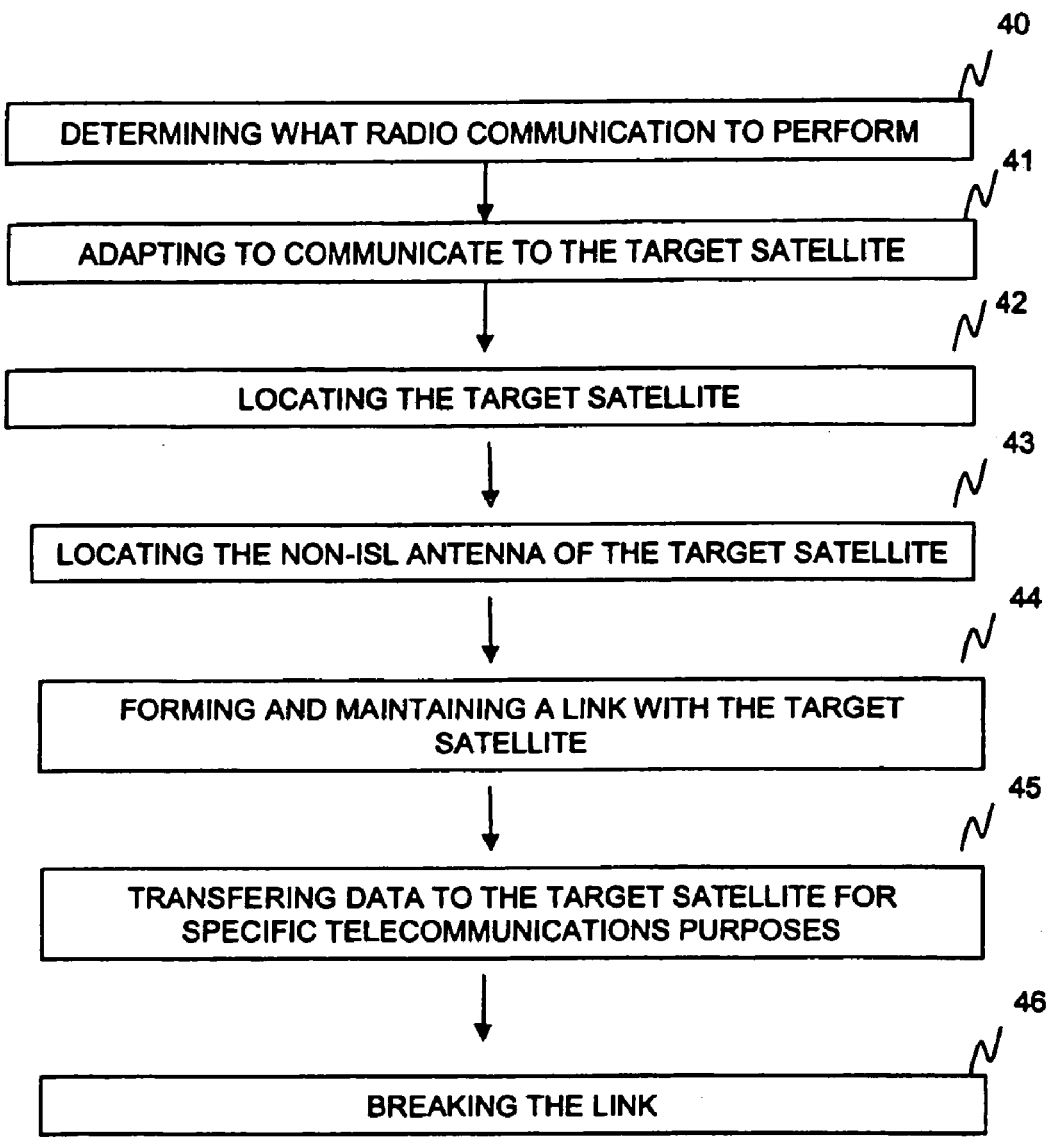
FIG. 4 is a flow diagram of a method for forming a communication link between the adaptable communications platform and a target satellite.

FIG. 4 is a flow chart of a method for forming a link between an ISL antenna on the adaptable communications platform of the present invention and a non-ISL antenna on a GEO satellite. The process begins in step 40, where an adaptable communications platform determines what radio communication service to perform. These services include satellite television, Internet, or communicating with a mobile communications device such as a cellular phone or an Iridium phone. The process then proceeds to step 41 where the communications platform adapts to be able to communicate with a target satellite. Adapting includes modifying the frequency of the signal, modifying the power transmitter, modifying the modulation, and selecting and implementing the proper protocol. These adaptations are implemented by using software, hardware, or a combination of both as will be discussed. The process then proceeds to step 42 where the adaptable communications platform locates the target satellite. The communications platform learns the location of the target satellite by having location information stored in a memory or HDD of the communication platform, or the location of the target satellite is transmitted to the communication platform. In an embodiment of the invention, the communication platform monitors its own location via the global positioning satellite system (GPS). The process then proceeds to step 43 where the adaptable communications platform locates the coverage of the non-ISL antenna of the target satellite as a function of the platforms location and height above Earth. The process then proceeds to step 44 where the adaptable communications platform forms and maintains a link with the target satellite once it concludes some degree of communication is possible. Initially, when in a fringe coverage area, the data rate is reduced to account for weak signal strength, but is progressively increased as the platform moves into a higher gain region of the satellite antenna pattern. The adaptable communications platform forms and maintains this link by knowing the predictable pattern of when the adaptable communications platform passes through different zones as will be discussed in reference to FIG. 11. Different zones include a time when the communications platform is communicating within a side lobe of the target satellite, or is communicating off-boresight while in a main lobe of the target satellite, or is communicating near-boresight or on-boresight while in the main lobe of the target satellite. The process then proceeds to step 45 where the adaptable communications platform transfers data to the target satellite for a specific telecommunications purpose. The communications platform adapts its beam width or its power to adjust the rate of data throughput as necessary. The process then proceeds to step 46 where the adaptable communications platform travels past the target satellite coverage area, the link is lost when it is out of range with the target satellite or the platform terminates the link when the data transfer is complete.

Figure 5:
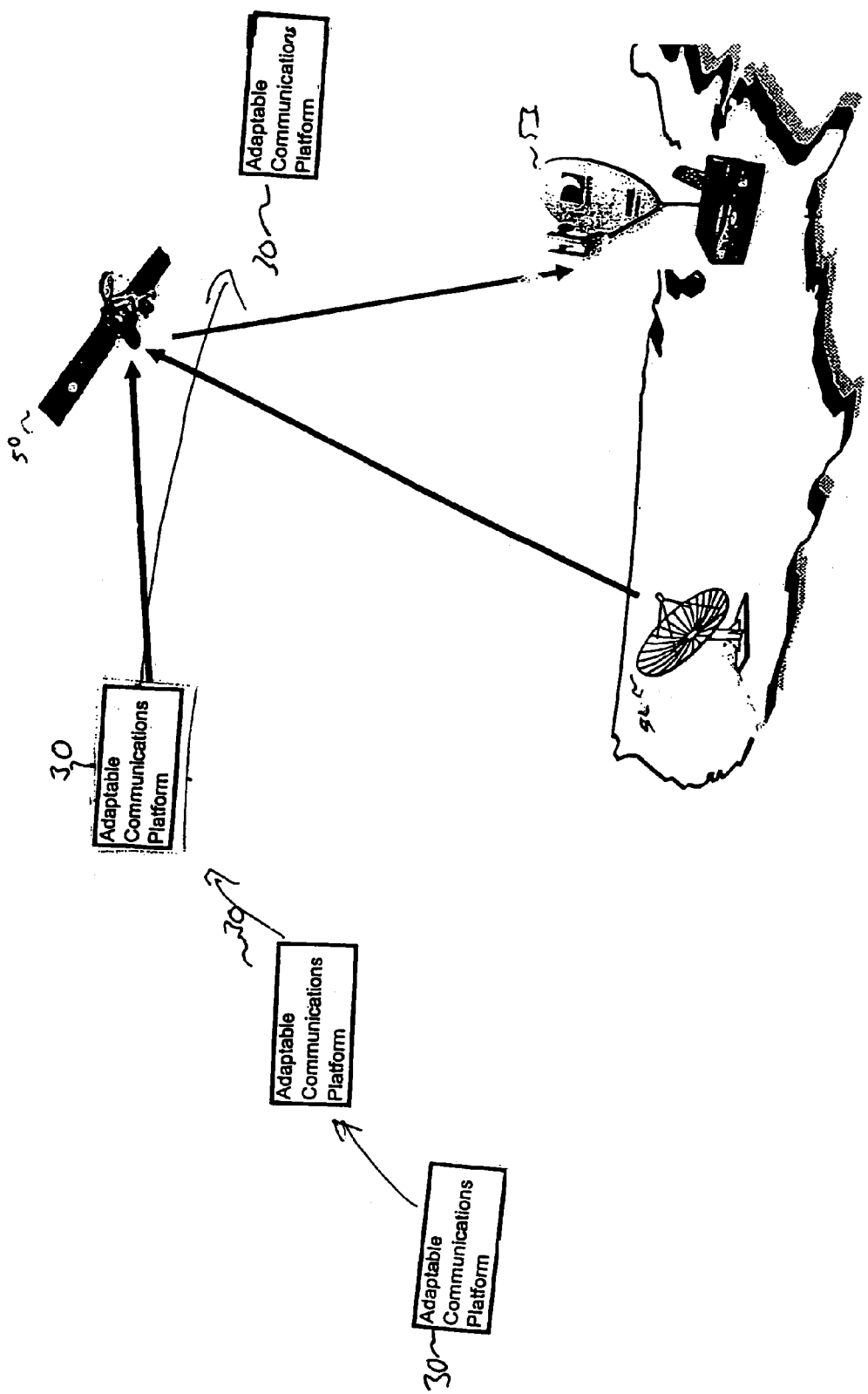
FIG. 5 is a diagram of a method for establishing communications between the adaptable communications platform and a target satellite.

FIG. 5 shows a process of establishing a communications link between an adaptable communications platform and a target satellite. Beginning at a time zero, an adaptable communications platform 30 is not yet in range to communicate with the target satellite 50, which in this case is a DirecTV satellite. While the adaptable communications platform 30 is not in range, the adaptable communications platform 30 determines that it is going to communicate with a DirecTV satellite 50. The adaptable communications platform accesses from a memory the protocol conventions for communicating with the DirecTV satellite 50. In another embodiment, the protocol conventions are transmitted to the adaptable communications platform from a remote source. These protocol conventions include the appropriate frequency, the appropriate power, the appropriate modulation, and the appropriate signaling protocol. These are the same conventions used by DirecTV Satellite TV uplink center 52. Proceeding to a time 1, the adaptable communications platform 30 locates a DirecTV satellite 50 and its non-ISL antenna.

Proceeding to a time 2, the adaptable communications platform 30 is in range to form a link with the DirecTV satellite 50. The adaptable communications platform 30 then forms and maintains a communications link, in accordance with the present invention, with DirecTV satellite 50, and transfers imagery pictures to DirecTV ground dish 53. In this embodiment, the communications platform 30 has adapted to communicate with DirecTV satellite 50 as if it were DirecTV satellite TV uplink center 52. Proceeding to a time three, the link between the adaptable communications platform 30 and DirecTV satellite 50 is broken when the communications platform 30 moves out of range or the information transfer is complete.

In another exemplary embodiment, the adaptable communications platform 30 adapts to communicate as an Internet streaming video delivery service through a relay on a standard, domestic commercial communications satellite (DOMSAT). The adaptable communications platform 30 changes frequency, power, modulation, and implements the appropriate Internet and Digital Video Broadcast Protocols to be able to relay pictures through DOMSAT in GEO to Internet Protocol enabled VSAT dishes. An example of this exemplary embodiment could possibly take the form of the SES Astra flexible point to multipoint satellite Internet Protocol video delivery system, the entire contents of which are incorporated by reference.

In another exemplary embodiment, the adaptable communications platform 30 communicates with Iridium satellites in low earth orbit (LEO). The adaptable communications platform 30 adapts by changing its modulation, frequency, power, etc. to fit the Iridium feeder link standards. This allows the adaptable communications platform 30 to communicate with Iridium satellites in the same manner that the Iridium feeder link gateway antenna does. The Iridium satellites, which possess ISL antennas as well as non-ISL feeder link antennas, in another embodiment, could send the information passed to their feeder link antennas by the adaptable communications platform into their ISL antennas for relay over a conventional ISL link to the ISL antenna of another Iridium satellite. This embodiment demonstrates an end-to-end communications link that combines the present invention utilizing communications between ISL and non-ISL antennas, and the older conventional approach of ISL communications between an ISL antenna and another ISL antenna.

In another exemplary embodiment, the adaptable communications platform 30 non-invasively broadcasts its signal over the feeder link frequencies of the Globalstar satellite telephone system in LEO by using a proprietary spread spectrum signal sent to a plurality of satellites. It is possible that this signal could be sent with or without the acknowledgement of the satellite operator, but satellite operator consent would always be a requirement.

In another embodiment, the adaptable communications platform 30 adapts to be able to send pictures to COMCAST customer's TV sets on channel 77, for example. The adaptable communications platform adapts to fit DOMSAT commercial GEO cable video satellite communications standards for a link. It may use Quadrature Amplitude Modulation (QAM) modulation standards common in the broadcast of cable television video. It is possible for the adaptable communications platform 30 to use a frequency that the DOMSAT service uplink is not using and to transmit pictures on that unused frequency.

In another exemplary embodiment, the communications platform 30 is pre-designed to communicate with a predetermined target satellite. The communications platform 30 adapts by adjusting it power settings, beginning transmissions when in communications range, and ending transmission once it is outside communications range. In another more basic embodiment, the communications platform is adaptable to merely change the power setting of the communications system from off to on.

Figure 6:
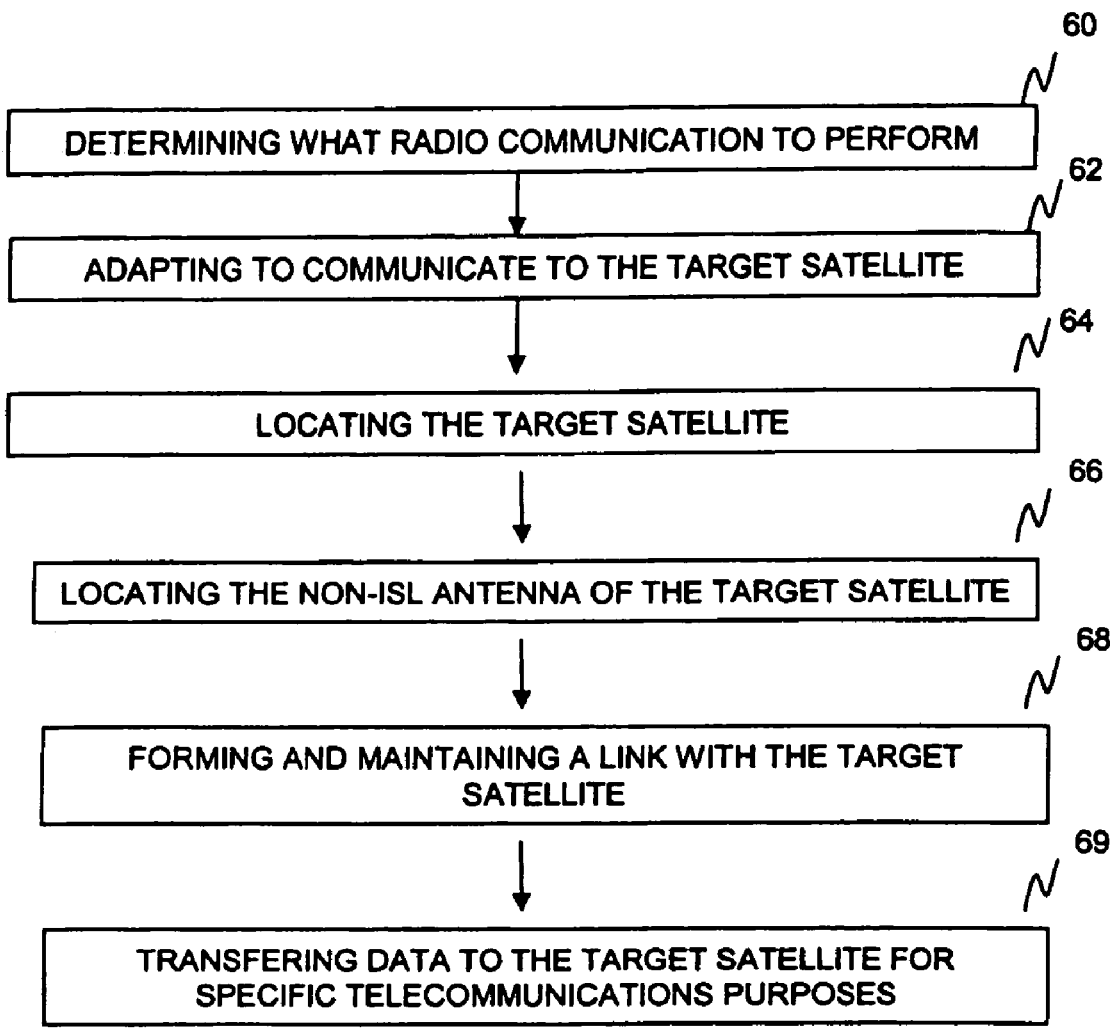
FIG. 6 is a flow diagram of a method used by an adaptable communication platform when communicating with a target satellite.

FIG. 6 is a flowchart of a method used by an adaptable communications platform with an ISL antenna to communicate with a target satellite through a non-ISL antenna. Beginning with step 60, the adaptable communications platform determines what radio communication service to perform. The process then proceeds to step 62 where the adaptable communications platform adapts to be able to communicate with the target satellite. The communications platform adapts by changing its power, frequency, modulation, protocol, and other conventions as necessary. The appropriate values for those variables are stored in and accessed by the adaptable communications platform. In another embodiment, these variables are transmitted to the adaptable communications platform from a remote source. The process then proceeds to step 64 where the adaptable communications platform locates the target satellite. The process then proceeds to step 66 where the adaptable communications platform locates the non-ISL antenna of the target satellite. The process then proceeds to step 68 where the adaptable communications platform forms and maintains a link with a non-ISL antenna of the target satellite. The process then proceeds to step 69 where the adaptable communications platform transfers data to the target satellite from its ISL antenna to the non-ISL antenna of the target satellite.

Figure 7:
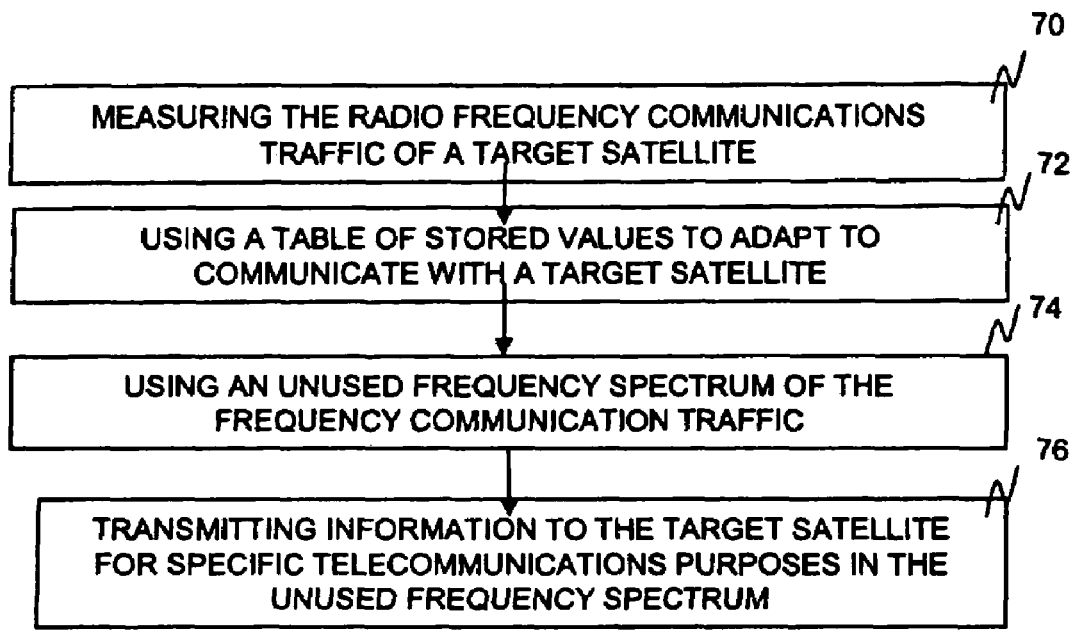
FIG. 7 is a flow diagram of a method for using an agile radio in an adaptable communications platform.

FIG. 7 is a flow diagram of a method for using a frequency agile radio in an adaptable communications platform. The use of a frequency agile radio with the present invention described herein is here named to be the PeerSat Link Agile Radio. Beginning with step 70, the adaptable communications platform measures the radio frequency communication traffic of a target satellite. The process then proceeds to step 72 where the adaptable communications platform uses a table of stored values to adapt to communicate with a target satellite. The stored values include frequency, power, modulation, and protocol conventions. The process then proceeds to step 74 where the adaptable communications platform uses the unused frequency spectrum of the frequency communication traffic between the target satellite and a ground station communicating with the target satellite. The process then proceeds to step 76 where the adaptable communications platform transmits information, in the unused frequency spectrum, to the target satellite for specific telecommunication purposes.

In another embodiment, the adaptable communications platform transmits information in the used frequency spectrum and temporarily replaces some of the existing communication traffic of the target satellite with the communications traffic of the adaptable communications platform. This embodiment is intended for emergency situations only, and this replacement would only be temporary in nature.

FIG. 8 depicts a table that shows information that an adaptable communications platform uses in an embodiment where it can adapt to multiple communication standards to communicate with varied target satellites. The table includes a list of satellites that are stored by number, name or any other means of identification. This table, as an example, shows satellites 1 and 2. This table also depicts zones. Satellite 1 is shown as having zones 1, 2, and 3. Satellite 2 is shown as having zone 1. The zones correspond to the zones shown in FIG. 11. Zones 1, 2 and 3 correspond to zone 1 being a side lobe, zone 2 being a main lobe and zone 3 being another side lobe. The table stores the appropriate signal frequency used to communicate with the target satellite. The table also stores the appropriate power necessary to communicate to the target satellite. The table shows how the power changes when the adaptable communications platform is communicating with the target satellite while in a main lobe or a side lobe. The table also stores the appropriate modulation and protocol conventions to be used. Since satellites 1 and 2 may be different, different protocols are used accordingly. The adaptable communications platform transmits data to the target satellite and that data is image data, audio data, video, or any other form of data that is sent through a radio frequency message.

Figure 9:
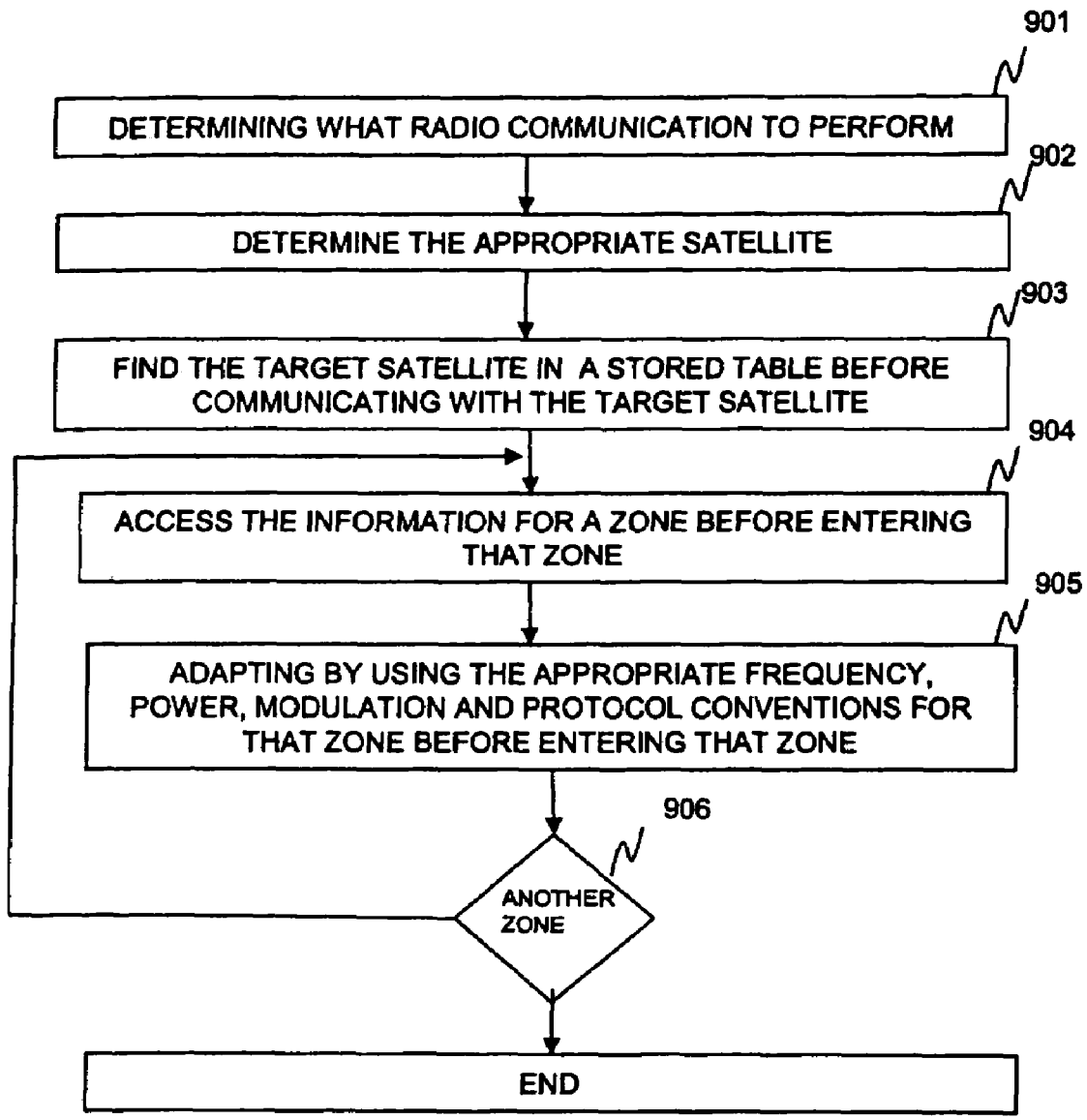
FIG. 9 is a flow diagram of a method for using the data structure look-up table.

FIG. 9 is a flow diagram of a method for using the data structure look-up table to determine what target satellite the adaptable communications platform is going to communicate with, and how to adapt to be able to communicate with that target satellite. Beginning with step 901, the adaptable communications platform determines what radio communication service to perform. The process then proceeds to step 902 where the adaptable communications platform determines the appropriate target satellite. The process then proceeds to step 903 where the adaptable communications platform locates the target satellite in a stored table that includes information necessary to communicate with the target satellite. The process then proceeds to step 904 where the adaptable communications platform accesses information for a zone of the target satellite before entering that zone. The process then proceeds to step 905 where the adaptable communications platform adapts by using the appropriate signal frequency, power, modulation, and protocol conventions for that zone, which are obtained from the stored table before entering that zone. If there are additional zones that the adaptable communications platform is entering, steps 904 and 905 are repeated.

Figure 10:
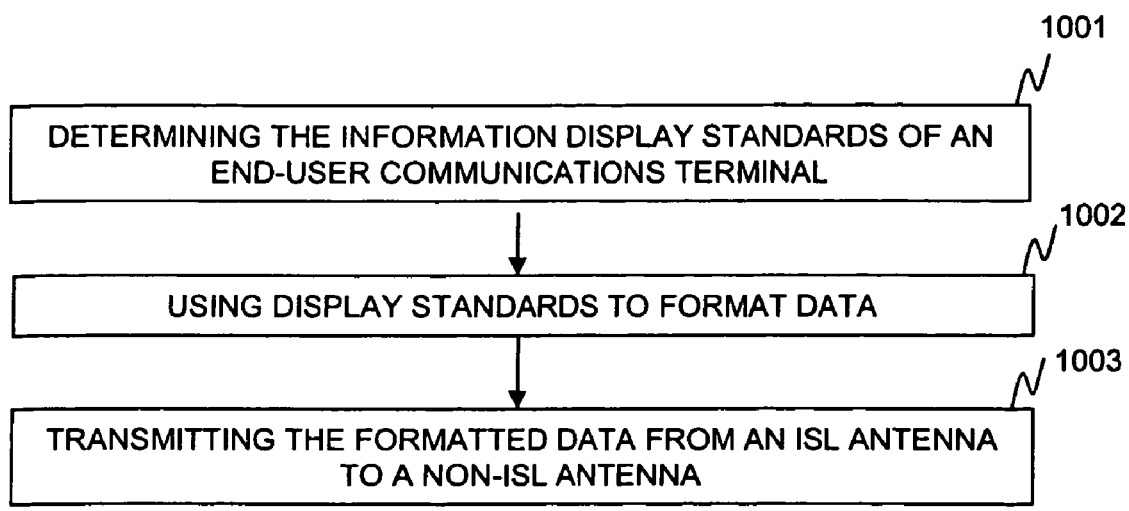
FIG. 10 is a flow diagram of a method for using the adaptable communications platform to relay information to an end-user device through a target satellite in a format that would display itself within a particular channel of that end-user device.

FIG. 10 is a flow diagram of a method for using a PeerSat Link Channeler. A PeerSat Link Channeler is used to create special audio and visual (A/V) channels of information tailored for specific end-user devices. The PeerSat Link Channeler allows the adaptable communications platform, discussed above, to transmit information to end-users on the television channel or telephone number or other communications channel that that end-user device recognizes. For example, information can be relayed from the adaptable communications platform through DOMSAT for display on channel 77 of Comcast Cable TV, to channel 93 of DirecTV Satellite TV, to a server hosting Real Networks Weather streaming video content, to a telephone number 703-555-2727, or to a specific email account.

The PeerSat Link Channeler uses hardware and computer software to determine the information display standards of an end user communications terminal, and uses those standards to format images, voice, video, data, and other content being sent over the communication system depicted in FIG. 3. Beginning with step 1001, the adaptable communications platform determines the information display standards of an end user communications terminal. The process then proceeds to step 1002 where the adaptable communications platform uses the display standards to format images, voice, video, data, or other content being transmitted. The process then proceeds to step 1003 where the adaptable communications platform sends the formatted data over a communications link between an ISL antenna and a non-ISL antenna. In an exemplary embodiment, a consumer has a picture from a satellite sent directly to channel 77 of their television set through only one link at the television broadcast satellite.

The PeerSat Link Channeler, which may be included in the adaptable communications platform, creates special audio and visual channels of information tailored for specific end-user devices. The PeerSat Link Channeler allows an adaptable communications platform to send information from an ISL antenna, to a satellite through a non-ISL antenna, and then directly to channel 77 of COMCAST cable TV, to a server hosting Real Networks streaming video content, or to phone number 555-2727. The PeerSat Link Channeler uses a combination of hardware and software (possibly application specific integrated circuits and other semiconductors) to coordinate or combine the functions of forward error correction, multiplexing, compression, conditional access, encryption, security, etc. The adaptable communications platform collectively creates the channel, phone call, etc, and sends the tailored information stream to the selected or registered group of users. In another embodiment, the PeerSat Link Channeler creates more than one channel and the adaptable communications platform sends content to multiple tailored groups of users who are connecting with different devices. As an example, the PeerSat Link Channeler combines, in software, Microsoft Windows Media Player 9 for encoding and compression, Kudelski conditional access, Kencast Fazzt forward error correction, and a multiplexer. To change distribution from DirecTV channel 77 to Verizon phone 555-2727, only the software of the PeerSat Link Channeler needs to be changed.

Figure 11:
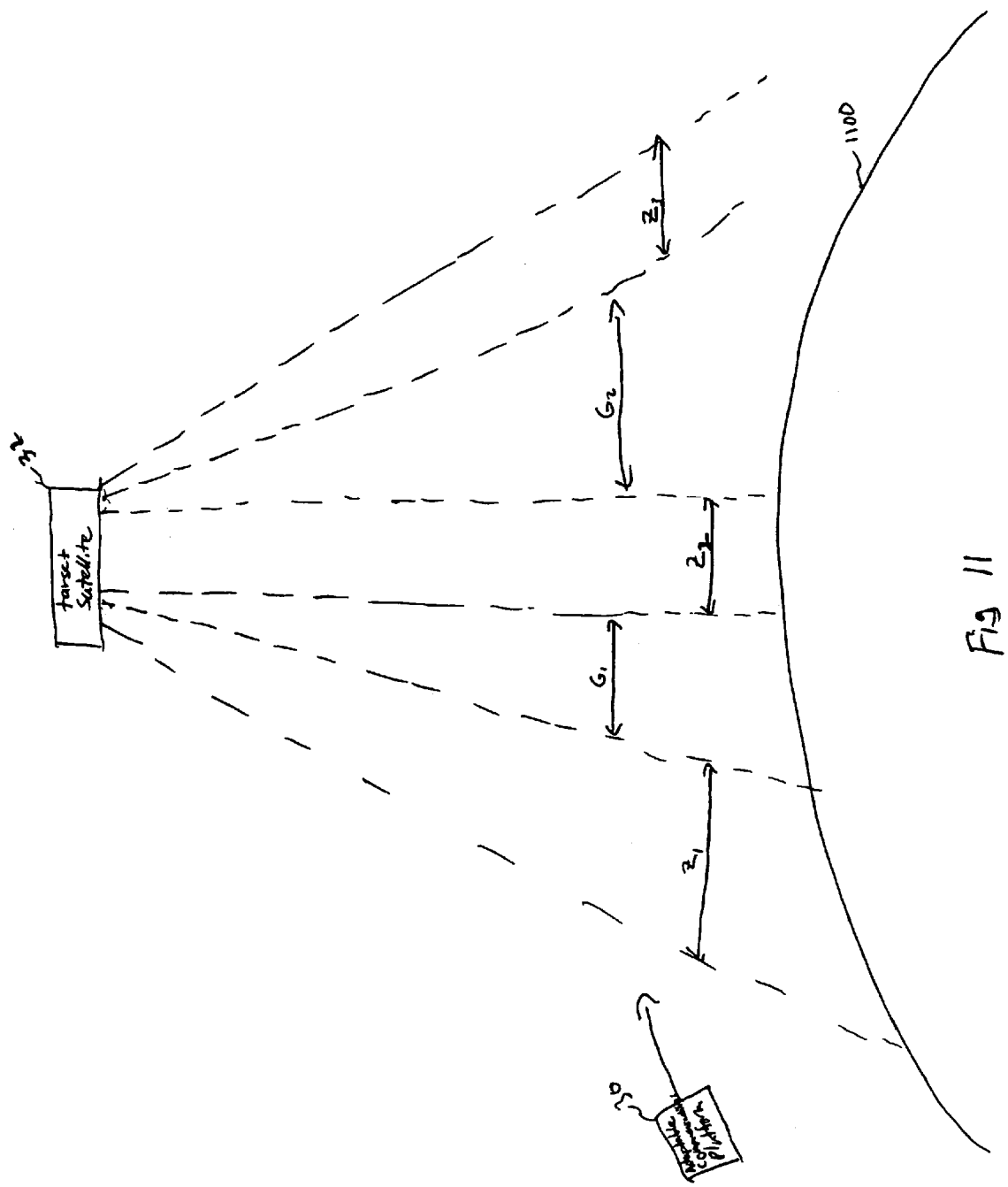
FIG. 11 is a diagram of zones of communication between an adaptable communications platform in space and a target satellite.

FIG. 11 is a diagram of zones of communication that exist between an adaptable communications platform in space and a target satellite. The adaptable communications platform passes through these zones when communicating with the target satellite. In this exemplary embodiment, the adaptable communications platform 30 is traveling in a low earth orbit. In FIG. 11, target satellite 32 for example is a GEO-stationary satellite. Target satellite 32 is shown as having three zones. The three zones are labeled z1, z2, and z3. z1 corresponds to a side lobe, z2 corresponds to a main lobe and z3 corresponds to another side lobe of the target satellite. The target satellite 32 is shown as having gap g1 between z1 and z2, and having gap g2 between z2 and z3. While in these gaps, the adaptable communications platform 30 is not within a main lobe or a side lobe of target satellite 32. It is possible that there are no gaps in communications, particularly when the adaptable communications satellite is communicating with a plurality of target satellites.

The above described embodiments of inter-satellite links are PeerSat Links. The abbreviation for a PeerSat Link is PSL.

As the adaptable communications platform 30 decides to communicate with target satellite 32, it accesses a table of stored information regarding the target satellite. Based on its course and the speed and location of the target satellite 32, the adaptable communications platform 30 knows when it is able to communicate with target satellite 32 and in which zone or zones it is going to pass through.

Figure 12:
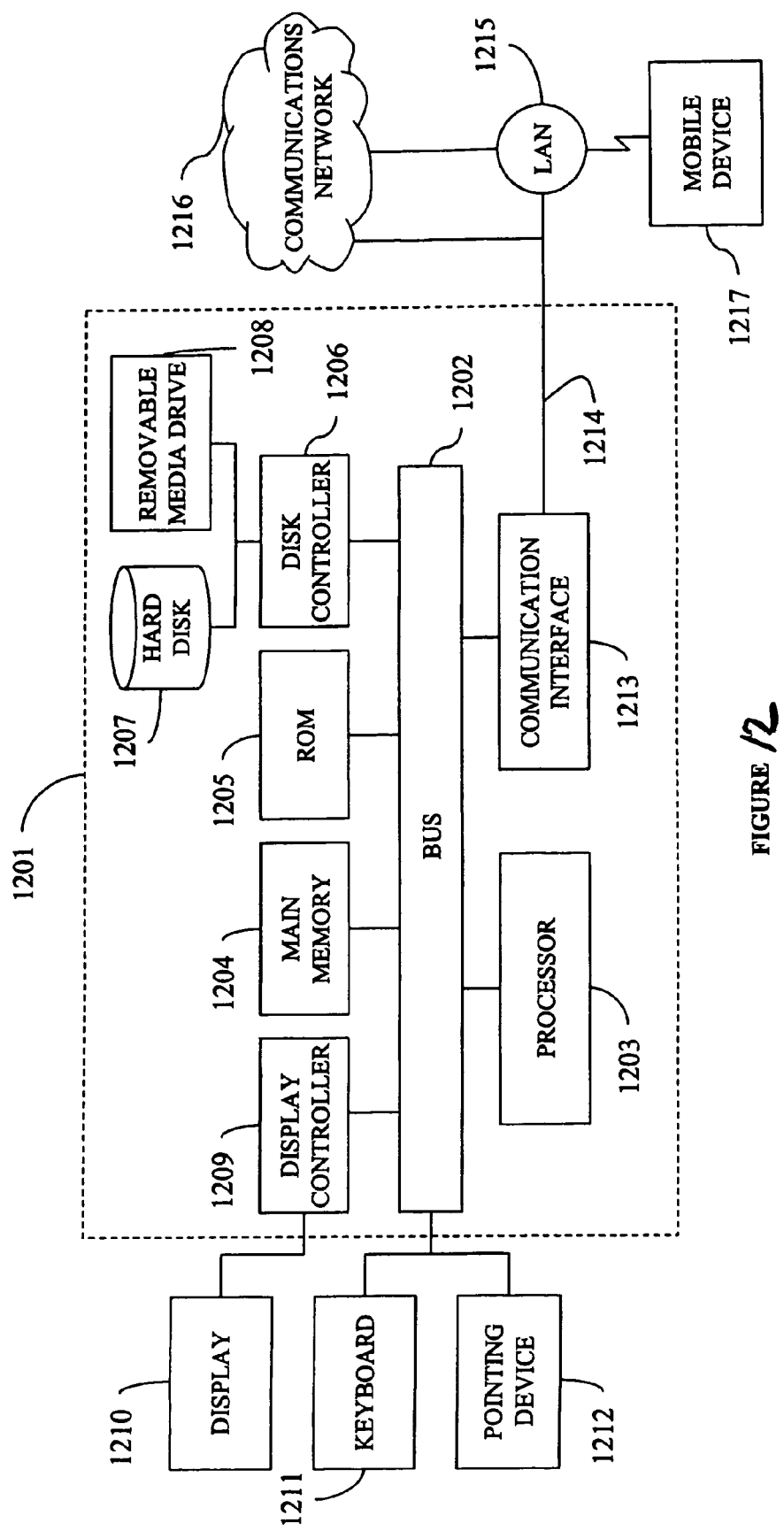
FIG. 12 is a block diagram of a computer system upon which an embodiment of the present invention may be implemented.

FIG. 12 is a block diagram of a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Figure 13:
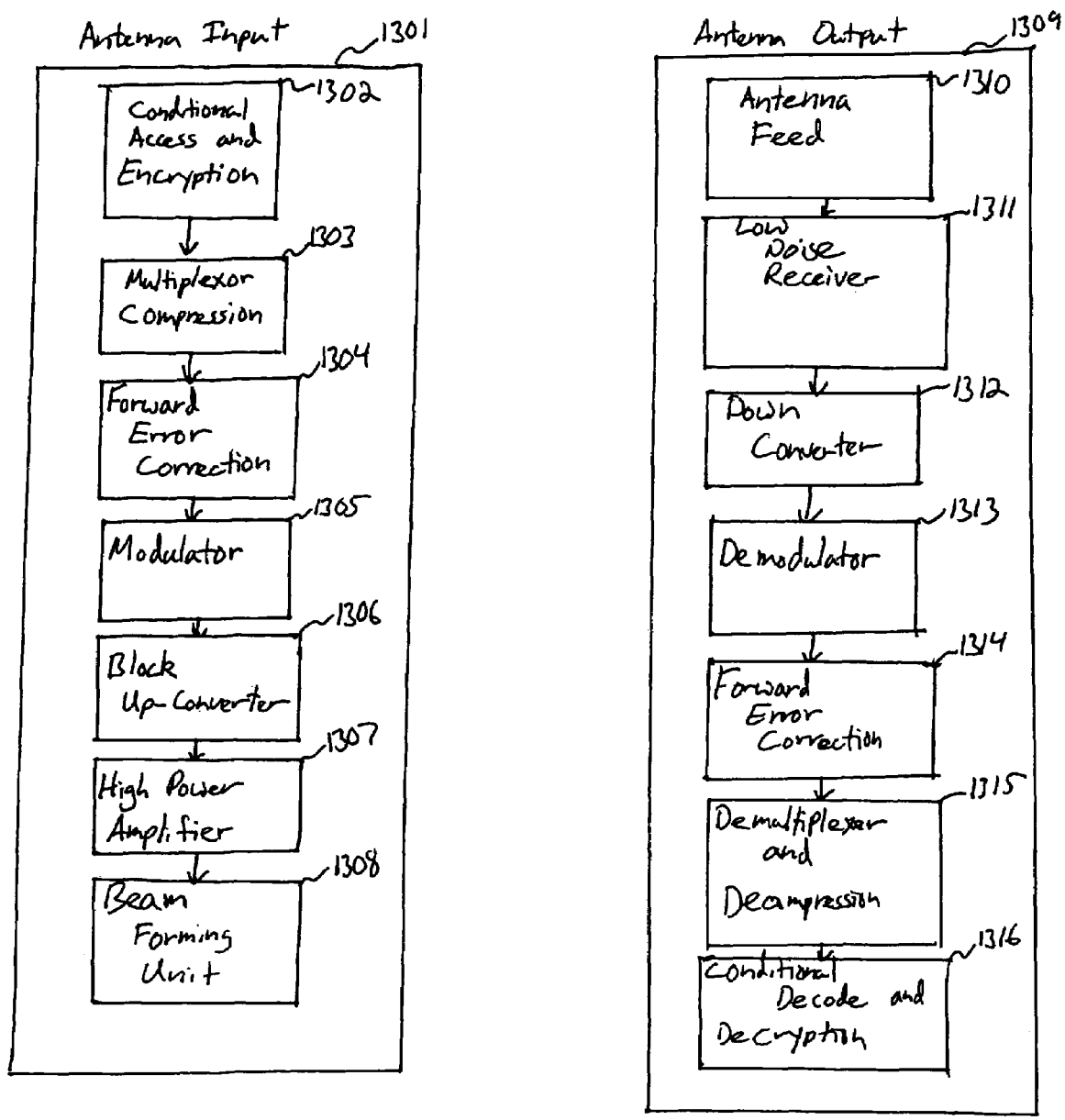
FIG. 13 is a block diagram of an indoor unit of a ground antenna, modified for ISL communications in space, for an embodiment of the present invention.

FIG. 13 is a block diagram of an indoor unit of a ground antenna that has been modified for use by the adaptable communications platform. This indoor unit is combined with a modified radio (or what is called an outdoor unit within the earth's atmosphere) from a conventional ISL antenna for use by the adaptable communications platform. An antenna or adaptable communications platform designed to conduct communication links described by the present invention is herein named a PeerSat Link Antenna.

The indoor unit of the satellite ground antenna in FIG. 13 is modified for space communication and is configured to be used inside an adaptable communications platform, because this indoor unit was originally designed for conventional ground to space communications with the non-ISL antenna of a potential target satellite. The indoor unit of the antenna consists of antenna input device 1301 and antenna output device 1309. The antenna input device includes conditional access and encryption unit 1302, multiplexer compression unit 1303, forward error correction 1304, modulator unit 1305, block up-converter unit 1306, high power amplifier 1307, and beam forming unit 1308. The antenna input device is connected to the antenna output device. Antenna output device 1309 includes antenna feed unit 1310, low noise receiver unit 1311, downward converter unit 1312, the modulator unit 1313, forward error correction unit 1314, the multiplexer and decompressor unit 1315, and conditional decode and encryption unit 1316.

The PeerSat Link Antenna on the adaptable communications platform is an efficient tool to establish a link between an ISL antenna and a non-ISL antenna. For example, the indoor unit of a Gilat/StarBand Skyblaster 360, which is designed to communicate through a commercial GEO DOMSAT to the Internet, is combined with a modified Space Shuttle out door unit ODU (the radio portion of the ISL antenna), which has demonstrated the pointing and tracking movement needed to link with DOMSAT's non-ISL antenna during similar movements tracking TDRSS ISL antennas for TDRSS ISL links. The Space Shuttle ODU radio's downlink frequencies of 15-15.2 GHz are changed to 11.7-12.2 GHz, and Shuttle ODU uplink frequencies are changed from 13.775-13.781 GHz to 14.0-14.5 GHz to facilitate communicating with this DOMSAT's Ku-band non-ISL frequencies. The Skyblaster IDU is already designed to provide two-way Internet access over a Ku-band space ODU, so it has an intermediate frequency blockup converter, modulator, multiplexer, encoder, error correction, compression, conditional access, Internet/file transfer protocols, etc. needed to conduct broadband Internet access after the radio link has been established between DOMSAT and the adaptable communications platform. Similar modifications could be made to other ISL ODU's, combined with Earth station IDU's to accomplish links according to the present invention.

The ODU antenna or radio of a PeerSat Link Antenna is a software and hardware device that can be used to improve pointing accuracy and the corresponding gain over current ISL standards. The digital up-down converter is built into a field programmable gate array. A tri-band feed would allow frequency to switch from L-band to higher C/Ku/Ka-bands, allowing the adaptable communications platform to link with multiple different DOMSAT non-ISL antennas within different frequency bands.

A software defined radio (SDR) allows an adaptable communications platform to change the modulation of signals with software. The software defined radio allows the adaptable communications platform to establish a link with multiple different types of satellites. For example, one space craft relays imagery data to MSS telephones, BSS TV dishes, and FSS cable TV headend over multiple different satellites using an antenna on the adaptable communications platform of the present invention. The SDR may allow one adaptable communications platform to switch between the BPSK, QPSK, 8PSK, QAM, CDMA, GSM, and other signal modulation waveforms that various communication devices utilize. An example of a SDR that has been tested in conventional ISL links in space is the ITT Industries Low Power Transceiver (LPT) software defined radio used in inter-satellite links with TDRSS, the entire contents of which are incorporated by reference. Other SDR's may also be used with the present invention.

In an embodiment of the present invention, forward error correction, compression, conditional access, and encryption are all done with software. The antenna uses software to link through DOMSAT's non-ISL antennas with as many different forward error correction, compression, conditional access, and encryption standards of communication as possible. With the above-described antenna, one satellite is able to take a picture, make an Iridium satellite phone call, and transfer pictures and Iridium phone messages to a DirecTV satellite dish or cable TV box.

In another embodiment, the agile radio is a software defined radio. The software adapts its modulation, etc. to communicate with multiple different types of satellites with TDMA, QAM, QPSK, BPSK, 8PSK, CDMA, GSM, and other multiple modulation formats.

In another embodiment of a PeerSat Link, a 1 or 2 kg communications platform with a 7 to 10 Watt L-band or S-band transceiver is configured to take low resolution photographs from space and then transmit those photographs over the GEO L-band frequencies of the Inmarsat, Thuraya, Motient/MSV/TMI, ACES or other GEO L-band or S-band satellite systems. A Comtech antenna is adapted to access these systems. In another embodiment, an ITT software defined radio is used to switch modulations from GSM, CDMA, etc. Other satellite and antenna configurations may be used.

In another embodiment of a PeerSat link, a 1 or 2 kg communications platform with a 7 to 10 Watt L-band or S-band transceiver is configured to take low resolution photographs from space and then transmit those photographs over the LEO L-band Iridium or Globalstar systems. A SENS OMNI-directional antenna made by AeroAstro Incorporated is modified to use spread spectrum techniques over multiple Globalstar satellites in LEO. In another embodiment, an ITT software defined radio is used to switch modulations from GSM, CDMA, etc. Other satellite and antenna configurations may also be used.

In another embodiment, a 15 to 75 kg satellite with a 20 to 50 watt Ku or Ka-band transceiver is configured to take high resolution photos or low resolution video from space and then relay those pictures and video over an SES Americom direct to home or Cable TV commercial satellites in GEO for viewing on Echostar satellite TV dishes or on Comcast/Charter/Time Warner cable set top boxes. In another embodiment, a spread spectrum technique is applied over the Ku-band using modified Omintracs type technology originally developed by Qualcomm Incorporated. An ITT software defined radio may be used to switch modulations from GSM, CDMA, etc. Other satellite and antenna configurations may also be used.

In another embodiment, a 15 to 75 kg communications platform has a 20 to 50 Watt Ku or Ka-band transceiver and 7 to 10 Watt L or S-band transceivers that are configured to take high resolution photos or low resolution video from space and then transmit those pictures/video over an SES Americom direct to home or cable TV satellite for viewing on Echostar satellite TV dishes or on Comcast/Charter/Time Warner cable set top boxes, or to transmit the pictures/video over L-band or S-band to Inmarsat, Globalstar, Iridium, MSV, Thuraya, ACES, etc. In another embodiment, a spread spectrum technique is applied over the Ku-band using Omnitracs type technology. An ITT software defined radio may be used to switch modulations from CDMA spread spectrum, to Cable TV standard QAM, to satellite TV standard QPSK modulations, or to satellite telephone GSM modulation waveforms. A voice telephone call from a Globalstar or Inmarsat mobile telephony satellite can be relayed through the adaptable communications platform in LEO to a SES Americom GEO satellite, and then on to the audio portion of a television set. Other satellite and antenna configurations may also be used.

Omnitracs was one of the first commercial uses of spread spectrum technology by Qualcomm Incorporated, and it was used on GEO Ku-band satellites starting about 15 years ago. Omnitracs dominates the trucking market. No one has used this on satellites or spacecraft for ISL links to other satellites or spacecraft as this invention intends. In an additional embodiment, Omnitracs technology is used to accesses two or more satellites from an adaptable communications platform in space using a wider beam width and lower power spread spectrum techniques.

In one embodiment, an aircraft Ku-band satellite antenna similar to on the one envisioned by Mitsubishi Electric, *Mitsubishi Electric Announces the Successful Development of an Airborne Ku-Band Antenna Subsystem for Satellite Commu-*

*nications*, Feb. 17, 2004, albeit heavily modified for space use and PeerSat Links, may be used, the entire contents of which are incorporated by reference.

In one embodiment, components similar to those used in the Boeing Connexion aircraft to satellite communications system, albeit heavily modified for space and PeerSat Links, may be used, the entire contents of which are incorporated by reference.

In one embodiment, technologies relating to the NASA communications and navigation demonstration on shuttle (CANDOS) experiment, described in *CANDOS EXPERIMENT OVERVIEW*, by David J. Israel, NASA Goddard Space Flight Center, and David J. Zillig, QSS Group Inc., albeit heavily modified for PeerSat links, may be used, the entire contents of which are incorporated by reference.

In one embodiment, a SENS patch antenna may be used for acquisition of the Globalstar satellite constellation, albeit heavily modified for PeerSat Links, the entire contents of which are incorporated by reference.

In one embodiment, a MT-2011 mobile satellite transceiver may be used albeit heavily modified for PeerSat Links, the entire contents of which are incorporated by reference. In conjunction with Comtech Mobile Datacom's packet data hub, the MT-2011 provides the ability to operate globally over many currently deployed L-band mobile satellite systems and is forward compatible with next generation systems. The MT-2011, if modified for PeerSat Links, could supply a solution to the tracking and communication needs of an adaptable communications platform on a LEO satellite. The MT-2011, because it is used in Northrop Grumman's FBCB2 Blue Force tracking and communication system, could be modified heavily within PeerSat Links to allow Blue Force tracking and communications of fast moving satellites and spacecraft.

In one embodiment, a laser pointing system is used, albeit adapted for PeerSat links. An example is the SILEX Program Laser Communication between Artemis and Spot 4, the entire contents of which are incorporated by reference. The laser pointing system would have higher accuracy than conventional pointing systems.

In one embodiment, the Ku-band Satcom Data Link for Predator, albeit heavily modified for space use and PeerSat links, may be used, the entire contents of which are incorporated by reference.

In one embodiment, data rates are adjusted by dynamic bandwidth allocation similar to processes used in Via Sat's Link Star VSAT system, the entire contents of which are incorporated by reference.

In one embodiment, link power control and quality of service may be managed as in VSAT Systems, Inc. broadband satellite Internet service, albeit adapted for space and PeerSat links, the entire contents of which are incorporated by reference.

In one embodiment, dynamic power control and routing is accomplished in accordance with *Dynamic Power Allocation and Routing for Satellite and Wireless Networks with Time Varying Channels*, by Michael J. Neely, Massachusetts Institute of Technology, Nov. 3, 2004, the entire contents of which are incorporated by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A communications system having at least one component in space, comprising:

a mobile communications platform configured for use in space and to transmit information through an interspacecraft link (ISL) antenna to a target satellite through a non-ISL antenna of the target satellite, wherein the target satellite is configured to transmit signals in a predetermined format to another communication platform, said mobile communications platform includes a controller configured to determine a location of the mobile communications platform, determine whether the target satellite is within communications range, and prepare a signal for transmission through the non-ISL antenna of the target satellite and for compatible reception at the another communications platform, said mobile communications platform is configured to relay transmissions through the non-ISL antenna of the target satellite to the another communications platform, the controller of the mobile communications platform is configured to adapt the mobile communications platform to be able to communicate with the target satellite, and the mobile communications platform is configured to communicate with more than one target satellite;

the mobile communications platform includes a table lookup device configured to identify a signaling format for a signal used to communicate with each target satellite, wherein the ISL antenna is configured to increase its beam width and lower its antenna gain in the direction of any one target satellite, and the controller is further configured to determine in which zone the mobile communications platform is located for the each target satellite, and adapt the mobile communications platform to communicate with the each target satellite by changing at least one of frequency, power, modulation, and protocol.

2. A communications system having at least one component in space, comprising:

a mobile communications platform configured for use in space and to transmit information through an interspacecraft link (ISL) antenna to a target satellite through a non-ISL antenna of the target satellite, wherein the target satellite is configured to transmit signals in a predetermined format to another communication platform, said mobile communications platform includes a controller configured to determine a location of the mobile communications platform, determine whether the target satellite is within communications range, and prepare a signal for transmission through the non-ISL antenna of the target satellite and for compatible reception at the another communications platform, said mobile communications platform is configured to relay transmissions through the non-ISL antenna of the target satellite to the another communications platform, the mobile communications platform is configured to adapt a data transfer rate thereof based on a capacity of a link formed with the target satellite, the mobile communications platform is further configured to determine if the mobile communications platform is located within at least one of a main-lobe and a side-lobe of the target satellite, and the non-ISL antenna of the target satellite is not configured to track a trajectory of the mobile communications platform.

3. A communications system having at least one component in space, comprising:
a mobile communications platform configured for use in space and to transmit information through an inter-spacecraft link (ISL) antenna to a target satellite through a non-ISL antenna of the target satellite, wherein
the target satellite is configured to transmit signals in a predetermined format to another communication platform,
said mobile communications platform includes a controller configured to
determine a location of the mobile communications platform,
determine whether the target satellite is within communications range, and
prepare a signal for transmission through the non-ISL antenna of the target satellite and for compatible reception at the another communications platform, and
said mobile communications platform is configured to relay transmissions through the non-ISL antenna of the target satellite to the another communications platform,
wherein the mobile communications platform further comprises:
a determination device configured to determine what radio communication parameters, including signaling format, are associated with the target satellite before the mobile communications platform enters a communication area of the target satellite, said determination device including
an identification device configured to identify the target satellite as being a next communications resource to communicate therewith;
a location device configured to locate the target satellite in a look-up table before attempting to establish a communications link with the target satellite;
an accessing device configured to access information in the look-up table for a particular zone into which the mobile communications platform moves for communicating with the target satellite; and
a transmitting device configured to transmit a signal in a proper signaling format through the target satellite while located in the particular zone of the target satellite before the mobile communications platform is no longer within the communication area of the target satellite.

4. A method of using an agile radio hosted on a mobile communications platform configured for use in space to relay transmissions through a non-ISL antenna of a target satellite, comprising steps of:
monitoring frequencies in use for radio communications with the non-ISL antenna of a target satellite while the mobile communications platform enters a communication area of the target satellite;
comparing frequencies identified in said monitoring step with a table of available frequencies stored in memory;
forming a signal to communicate with the target satellite formatted to be compatible with a signaling format used by the target satellite; and
transmitting the signal in an unused frequency spectrum of the target satellite so as to transmit information through the target satellite for a predetermined telecommunications purpose before the mobile communications platform is no longer within the communication area of the target satellite.

5. An agile radio hosted on a mobile communications platform configured for use in space to relay transmissions through a non-ISL antenna of a target satellite, comprising:
a monitoring device configured to monitor frequencies to generate monitored frequencies in use for radio communications with the target satellite while the mobile communications platform enters a communication area of a target satellite;
a comparing device configured to compare the monitored frequencies in use with a table of available frequencies stored in memory;
a table look-up device configure to identify a signaling format for a signal used to communicate with the target satellite; and
a transmitter configured to use an unused frequency spectrum within the available frequencies of the target satellite to transmit the signal through the target satellite for a predetermined telecommunications purpose before the mobile communications platform is no longer within the communication area of the target satellite.

6. A method of a mobile communications platform configured to use a look-up table in space to adapt to communicate with non-ISL antenna of a target satellite, comprising steps of:
determining what radio communication parameters, including signaling format, are associated with the target satellite before the mobile communications platform enters a communication area of the target satellite, said determining step including
identifying the target satellite as being a next communication resource to communicate with, and
locating the target satellite in the look-up table before attempting to establish a communications link with the target satellite;
accessing information in the look-up table for a particular zone into which the mobile communications platform moves for communicating with the target satellite; and
transmitting a signal in the signaling format through the target satellite while located in the particular zone before the mobile communications platform is no longer within the communication area of the target satellite.

7. The method of claim 6, wherein the zone includes a side-lobe, a main-lobe, or a narrow beam.

8. A mobile communications platform in space configured to use a look-up table to adapt to communicate with a non-ISL antenna of a target satellite, comprising:
a determination device configured to determine what radio communication parameters, including signaling format, are associated with the target satellite before the mobile communications platform enters a communication area of the target satellite, said determination device including
an identification device configured to identify the target satellite as being a next communications resource to communicate therewith;
a location device configured to locate the target satellite in the look-up table before attempting to establish a communications link with the target satellite;
an accessing device configured to access information in the look-up table for a particular zone into which the mobile communications platform moves for communicating with the target satellite; and
a transmitting device configured to transmit a signal in the signaling format through the target satellite while located in the particular zone of the target satellite before the mobile communications platform is no longer within the communication area of the target satellite.

9. The mobile communications platform of claim 8, wherein the zone includes a side-lobe, a main-lobe, or a narrow beam.

10. A method for using a link channeler on a mobile communications platform, comprising steps of:
   determining an information display standard of an end-user communication terminal while the mobile communications platform enters a communication area of a non-ISL antenna of a target satellite;
   using the information display standard to format data and generate formatted data to be transmitted from an ISL antenna of the mobile communications platform to the non-ISL antenna of the target satellite;
   transmitting the formatted data over a link formed between the ISL antenna on the mobile communications platform and the non-ISL antenna on the target satellite before the mobile communications platform exits the communication area of the target satellite; and
   said target satellite relaying the data to the end-user communication terminal in an appropriate format to transmit information over a communications link.

11. A link channeler used in a mobile communications platform, comprising:
   a determination device configured to determine an information display standard of an end-user communication terminal while the mobile communications platform enters a communication area of a target satellite;
   a format device configured to use the information display standards to format data to generate formatted data to be transmitted from an ISL antenna of the mobile communications platform to a non-ISL antenna of the target satellite;
   a transmitter configured to transmit the formatted data over a link formed between the ISL antenna on the mobile communications platform and the non-ISL antenna on the target satellite before the mobile communications platform exits the communication area of the target satellite; and
   said target satellite relaying the data to the end-user communication terminal.

12. A method of using a software defined radio hosted on a mobile communications platform configured for use in space to relay transmissions through a non-ISL antenna of a target satellite, comprising steps of:
   looking up signal formatted parameters for use in radio communications with the non-ISL antenna of the target satellite while the mobile communications platform enters a communication area of the target satellite;
   comparing the signal formatted parameters with a table of all available modulation waveforms stored in memory;
   adapting the signal formatted parameters with the software defined radio on board the mobile communications platform to communicate with the non-ISL antenna of the target satellite; and
   communicating using a signal having the signal formatted parameters with the non-ISL antenna of the target satellite to transmit information through the target satellite for a specific telecommunications purpose to close an end-to-end communication link before the mobile communications platform is no longer within the communication area of the target satellite.

13. A communications system having at least one component in space, comprising:
   a mobile communications platform configured for use in space and to transmit information through an inter-spacecraft (ISL) antenna to a target satellite through a non-ISL antenna of the target satellite using a same transmission format and communication standard that a non-ISL antenna would receive from a conventional antenna within the Earth's atmosphere designed to communicate with the non-ISL antenna, wherein
   said mobile communications platform includes a controller configured to
      determine a location of the mobile communications platform,
      determine whether the target satellite is within communications range, and
      prepare a signal for transmission through the non-ISL antenna of the target satellite and for compatible reception at another communication platform communicatively linked to the conventional antenna that uses the same transmission format and communications standard that the non-ISL antenna normally receives from the conventional ground antenna designed to operate with that non-ISL antenna, and
   the mobile communications platform is configured to relay the signal through the non-ISL antenna of the target satellite to the another communications platform.

14. A communications system having at least one component in space, comprising:
   a mobile communications platform configured for use in space and to transmit information through an inter-spacecraft link (ISL) antenna to a target satellite through a non-ISL antenna of the target satellite, wherein
   the target satellite is configured to transmit signals in a predetermined format to another communication platform,
   said mobile communications platform includes a controller configured to
      determine a location of the mobile communications platform,
      determine whether the target satellite is within communications range, and
      prepare a signal for transmission through the non-ISL antenna of the target satellite and for compatible reception at the another communications platform,
   said mobile communications platform is configured to relay transmissions through the non-ISL antenna of the target satellite to the another communications platform,
   the controller of the mobile communications platform is configured to adapt the mobile communications platform to be able to communicate with the target satellite, and
   the mobile communications platform is configured to communicate with more than one target satellite;
   the mobile communications platform includes a table look-up device configured to identify a signaling format for a signal used to communicate with each target satellite; and
   the ISL antenna is configured to increase its beam width and lower its antenna gain in the direction of any one target satellite.

15. A communications system having at least one component in space, comprising:
   a mobile communications platform configured for use in space and to transmit information through an inter-spacecraft link (ISL) antenna to a target satellite through a non-ISL antenna of the target satellite, wherein the target satellite is configured to transmit signals in a predetermined format to another communication platform, said mobile communications platform includes a controller configured to determine a location of the mobile communications platform, determine whether the target satellite is within communications range, and prepare a signal for transmission through the non-ISL antenna of the target satellite and for compatible reception at the another communications platform, said mobile communications platform is configured to relay transmissions through the non-ISL antenna of the target satellite to the another communications platform, the controller of the mobile communications platform is configured to adapt the mobile communications platform to be able to communicate with the target satellite, and the mobile communications platform is configured to communicate with more than one target satellite, and the controller is further configured to determine in which zone the mobile communications platform is located for the each target satellite, and adapt the mobile communications platform to communicate with the each target satellite by changing at least one of frequency, power, modulation, and protocol.

16. A communications system having at least one component in space, comprising:

a mobile communications platform configured for use in space and to transmit information through an inter-spacecraft link (ISL) antenna to a target satellite through a non-ISL antenna of the target satellite, wherein the target satellite is configured to transmit signals in a predetermined format to another communication platform, said mobile communications platform includes a controller configured to determine a location of the mobile communications platform, determine whether the target satellite is within communications range, and prepare a signal for transmission through the non-ISL antenna of the target satellite and for compatible reception at the another communications platform, said mobile communications platform is configured to relay transmissions through the non-ISL antenna of the target satellite to the another communications platform, the controller of the mobile communications platform is configured to adapt the mobile communications platform to be able to communicate with the target satellite, and the mobile communications platform is configured to communicate with more than one target satellite;

the mobile communications platform includes a table look-up device configured to identify a signaling format for a signal used to communicate with at least two target satellites at a same time; and the ISL antenna is configured to increase its beam width and lower its antenna gain in a direction of at least two or more satellites to transmit information to the another communications platform.

\* \* \* \* \*